US010643295B2

(12) United States Patent
Lyons et al.

(10) Patent No.: US 10,643,295 B2
(45) Date of Patent: *May 5, 2020

(54) GEOMETRIC ENUMERATED WATERMARK EMBEDDING FOR COLORS AND INKS

(71) Applicant: Digimarc Corporation, Beaverton, OR (US)

(72) Inventors: Robert G. Lyons, Portland, OR (US); Alastair M. Reed, Lake Oswego, OR (US); John F. Stach, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,640

(22) Filed: Nov. 9, 2018

(65) Prior Publication Data

US 2019/0347755 A1 Nov. 14, 2019

Related U.S. Application Data

(60) Continuation of application No. 15/650,497, filed on Jul. 14, 2017, now Pat. No. 10,127,623, which is a continuation of application No. 15/266,127, filed on Sep. 15, 2016, now Pat. No. 9,710,871, which is a division of application No. 13/975,919, filed on Aug. 26, 2013, now Pat. No. 9,449,357.

(60) Provisional application No. 61/749,767, filed on Jan. 7, 2013, provisional application No. 61/693,106, filed on Aug. 24, 2012.

(51) Int. Cl.
*G06K 9/00* (2006.01)
*G06T 1/00* (2006.01)

(52) U.S. Cl.
CPC ............ *G06T 1/005* (2013.01); *G06T 1/0021* (2013.01); *G06T 1/0028* (2013.01); *G06T 2201/0083* (2013.01); *G06T 2201/0202* (2013.01)

(58) Field of Classification Search
None
See application file for complete search history.

(56) References Cited

U.S. PATENT DOCUMENTS

| | | | |
|---|---|---|---|
| 5,394,483 A | 2/1995 | Daly | |
| 5,636,292 A | 6/1997 | Rhoads | |
| 5,721,788 A | 2/1998 | Powell | |
| 5,862,260 A | 1/1999 | Rhoads | |
| 5,905,819 A | 5/1999 | Daly | |
| 6,122,403 A | 9/2000 | Rhoads | |
| 6,130,741 A | 10/2000 | Wen | |
| 6,157,735 A | 12/2000 | Holub | |
| 6,345,104 B1 | 2/2002 | Rhoads | |
| 6,408,082 B1 | 6/2002 | Rhoads | |

(Continued)

FOREIGN PATENT DOCUMENTS

WO 2016025631 A1 2/2016

OTHER PUBLICATIONS

A. B. Watson, J. Hu, and J.F. McGowan III, "Digital Video Quality Metric Based on Human Vision," Journal of Electronic Imaging, vol. 10, No. 1, pp. 20-29 (2001).

(Continued)

*Primary Examiner* — Atiba O Fitzpatrick
(74) *Attorney, Agent, or Firm* — Digimarc Corporation

(57) ABSTRACT

The present disclosure relates generally to digital watermarking and signal encoding. Various colors can be evaluated and modified to carry an encoded or auxiliary signal.

18 Claims, 30 Drawing Sheets

(56) References Cited

U.S. PATENT DOCUMENTS

| | | |
|---|---|---|
| 6,449,377 B1 | 9/2002 | Rhoads |
| 6,559,975 B1 | 5/2003 | Tolmer |
| 6,590,996 B1 | 7/2003 | Reed |
| 6,614,914 B1 | 9/2003 | Rhoads |
| 6,631,198 B1 | 10/2003 | Hannigan |
| 6,718,046 B2 | 4/2004 | Reed |
| 6,721,439 B1 | 4/2004 | Levy |
| 6,763,123 B2 | 7/2004 | Reed |
| 6,763,124 B2 | 7/2004 | Alattar |
| 6,792,129 B1 | 9/2004 | Zeng |
| 6,885,757 B2 | 4/2005 | Bloom |
| 6,891,959 B2 | 5/2005 | Reed |
| 6,912,295 B2 | 6/2005 | Reed |
| 6,947,571 B1 | 9/2005 | Rhoads |
| 6,993,149 B2 | 1/2006 | Brunk |
| 7,027,614 B2 | 4/2006 | Reed |
| 7,070,252 B2 | 7/2006 | De |
| 7,298,865 B2 | 11/2007 | Lubin |
| 7,352,878 B2 | 4/2008 | Reed |
| 7,783,130 B2 | 8/2010 | Watson |
| 8,094,869 B2 | 1/2012 | Reed |
| 8,199,969 B2 | 6/2012 | Reed |
| 8,310,718 B2 | 11/2012 | Chapman |
| 8,422,795 B2 | 4/2013 | Pahalawatta |
| 8,437,403 B2 | 5/2013 | Babonneau |
| 8,743,158 B2 | 6/2014 | Kang |
| 8,913,780 B2 | 12/2014 | Reed |
| 8,971,567 B2 | 3/2015 | Reed |
| 9,129,277 B2 | 9/2015 | MacIntosh |
| 9,136,300 B2 | 9/2015 | Rhoads |
| 9,179,033 B2 | 11/2015 | Reed |
| 9,224,184 B2 | 12/2015 | Bai |
| 9,245,308 B2 | 1/2016 | Reed |
| 9,380,186 B2 | 6/2016 | Reed |
| 9,401,001 B2 | 7/2016 | Reed |
| 9,449,357 B1 | 9/2016 | Lyons |
| 9,565,335 B2 | 2/2017 | Reed |
| 9,665,919 B2 | 5/2017 | Reed |
| 9,667,829 B2 | 5/2017 | Bai |
| 9,710,871 B2 | 7/2017 | Lyons |
| 9,747,656 B2 | 8/2017 | Stach |
| 9,754,341 B2 | 9/2017 | Falkenstern |
| 9,805,435 B2 | 10/2017 | Reed |
| 9,864,919 B2 | 1/2018 | Reed |
| 1,027,093 A1 | 4/2019 | Bai Yang |
| 2002/0126872 A1 | 9/2002 | Brunk |
| 2003/0058477 A1 | 3/2003 | Brunk |
| 2003/0189568 A1 | 10/2003 | Alkouh |
| 2005/0114667 A1 | 5/2005 | Haas |
| 2006/0072778 A1 | 4/2006 | Harrington |
| 2006/0165311 A1 | 7/2006 | Watson |
| 2008/0149713 A1 | 6/2008 | Brundage |
| 2009/0135013 A1 | 5/2009 | Kushida |
| 2010/0150434 A1 | 6/2010 | Reed |
| 2012/0014557 A1 | 1/2012 | Reed |
| 2013/0289941 A1 | 10/2013 | Keydar |
| 2013/0329006 A1 | 12/2013 | Boles |
| 2013/0335783 A1 | 12/2013 | Kurtz |
| 2014/0119593 A1 | 5/2014 | Filler |
| 2014/0240533 A1 | 8/2014 | Hirooka |
| 2015/0156369 A1 | 6/2015 | Reed |
| 2015/0187039 A1 | 7/2015 | Reed |
| 2016/0198064 A1 | 7/2016 | Bai |

OTHER PUBLICATIONS

A. Wachter and L. T. Biegler, 'On the implementation of a primal-dual interior point filter line search algorithm for large-scale non-linear programming.' Mathematical Programming, vol. 106, issue (1): pp. 25-57, 2006.
Amended Claim Set in EP3164849, appln. No. 15832448.3, which is the EP National Stage of PCT/US2015044904, 4 pages.
Amended claims accompanying Applicant Response dated Aug. 24, 2018, in response to the European search report and communication dated Feb. 2018, in EP3164849, appln. No. 15832448.3, which is the EP National Stage of PCT/US2015044904, 5 pages.
Applicant Response dated Aug. 24, 2018 in response to the European search report and communication dated Feb. 2018, in EP3164849, appln. No. 15832448.3, which is the EP National Stage of PCT/US2015044904, 4 pages.
Battiato et al., 'Robust Watermarking for Images Based on Color Manipulation,' IH/99 LNCS 1768, pp. 302-317, 2000.
Daly, 'Application of a Noise-Adaptive Contrast Sensitivity Function to Image Data Compression,' Optical Engineering, Aug. 1990, vol. 29. No. 8, pp. 977-987.
Deshpande, et al. 'A simplified method of predicting the colorimetry of spot color overprints,' 18th Color Imaging Conference: Color Science and Engineering Systems, Technologies and Applications, p. 213-216, San Antonio, USA 2010.
EP3164849, which is the EP National Stage of PCT/US2015044904, Extract from the Register of European Patents, including Search Results. Printed Jun. 14, 2018, 2 pages.
Extended European Search Report in EP3164849, which is the EP National Stage of PCT/US2015044904. dated Feb. 2, 2018, 11 pages.
Feb. 1, 2016 Non-final Action, Feb. 12, 2016 Amendment, Mar. 4, 2016 Notice of Allowance, May 20, 2016 Amendment after Notice of Allowance and Applicant Summary of interview with Examiner, all from parent U.S. Pat. No. 9,401,001, 66 pages.
Fleet et al., 'Embedding Invisible Information in Color Images,' Proc. Int. Conf. on Image Processing, vol. 1, pp. 532-535, Oct. 1997.
G.J. van der Horst and M.A. Bouman, 'Spatiotemporal chromaticity discrimination', Journal of Optical Society of America, 59, 1969. (7 pages).
International Preliminary Report on Patentability Chapter I, dated Feb. 14, 2017, from PCT/US2015/044904 (application published as WO 2016/025631 Al), 12 pages.
International Search Report and Written Opinion dated Nov. 25, 2015 from PCT/US2015/044904 (published as WO 2016025631 Al), 22 pages.
Itti et al., 'A Model of Saliency-Based Visual Attention for Rapid Scene Analysis,' IEEE Transactions on Pattern Analysis and Machine Intelligence, vol. 20, No. 11, Nov. 1998, pp. 1254-1259.
Jan. 4, 2016 Amendment and Dec. 30, 2015 non-final Action, each from assignee's U.S. Appl. No. 14/616,686 (issued as U.S. Pat. No. 9,380,186), 55 pages.
L. van Nes and M.A. Bouman, 'Spatial modulation transfer in the human eye', Journal of Optical Society of America, 57(3):401-406, Mar. 1967. (6 pages).
Piva et al., 'Exploiting the Cross-Correlation of RGB-Channels for Robust Watermarking of Color Images,' 1999 IEEE, pp. 306-310.
R. Lyons et al, 'Geometric enumerated chrominance watermark for spot colors,' In Q. Lin, J.P. Alleback and Z. Fan, editors, Proceedings SPIE 8664, Imaging and Printing in a Web 2.0 World IV, vol. 8664, Mar. 2013, 6 pages.
Reed et al, "Adaptive Color Watermarking," Proc. SPIE, vol. 4675, pp. 222-229, 8 pages, Jan. 21, 2002.
Reed et al., 'Full-color visibility model using CSF which varies spatially with local luminance,' PowerPoint slides presented at Imaging and Multimedia Analytics in a Web and Mobile World 2014 conf., San Francisco, CA, United States, Feb. 5, 2014, 12 pages.
Reed et al., 'Watermarking Spot Colors in Packaging,' Media Watermarking, Security and Forensics 2015, edited by Adnan M. Alattar, Nasir D. Memon, Chad D. Heitzenrater, Proc. of SPIE-IS&T vol. 9409, pp. 940906-1/940906-13.
Scott J. Daly, 'Visible differences predictor: an algorithm for the assessment of image fidelity', Proc. SPIE 1666, Human Vision, Visual Processing, and Digital Display III, 2 (Aug. 27, 1992), 14 pages.
U.S. Appl. No. 13/975,919, filed Aug. 26, 2013. (59 pgs.).
U.S. Appl. No. 61/923,060, filed Jan. 2, 2014, 64 pages.
U.S. Appl. No. 13/975,919, filed Aug. 26, 2013, 58 pages.
U.S. Appl. No. 14/932,645, filed Nov. 4, 2015, 114 pages.
U.S. Appl. No. 62/102,247, filed Jan. 12, 2015, 118 pages.

(56) References Cited

OTHER PUBLICATIONS

Vidal et al., 'Non-Noticeable Information Embedding in Color Images: Marking and Detection,' IEEE (1999), pp. 293-297.
WO 2016025631 Al, published Feb. 18, 2016, 80 pages.
Written Opinion of the International Search Authority , dated Feb. 18, 2016 from PCT/US2015/044904 (application published as WO 2016/025631 Al), 11 pages.
Written Opinion of the International Searching Authority dated Nov. 25, 2015 from PCT/US2015/044904 (application published as WO 2016/025631 Al), 22 pages.
Wyble et al., "A critical review of spectral models applied to binary color printing," Color Research & Application, 25(1):4-19, 2000.
X. Zhang et al., e.g., 'A spatial extension of CIELAB for digital color image reproduction,' in Proceedings of the Society of Information Display Symposium (SID'96), vol. 27, pp. 731-734, San Jose, Calif, USA, Jun. 1996.

FIG. 25

GEOMETRIC ENUMERATED WATERMARK EMBEDDING FOR COLORS AND INKS

RELATED APPLICATION DATA

This application is a continuation of U.S. patent application Ser. No. 15/650,497, filed Jul. 14, 2017 (U.S. Pat. No. 10,127,623) which is a continuation of U.S. patent application Ser. No. 15/266,127, filed Sep. 15, 2016 (U.S. Pat. No. 9,710,871) which is a division of U.S. patent application Ser. No. 13/975,919, filed Aug. 26, 2013 (U.S. Pat. No. 9,449,357), which claims the benefit of US Provisional Application Nos. 61/693,106, filed Aug. 24, 2012 and 61/749,767, filed Jan. 7, 2013. This application is related to U.S. Pat. No. 8,199,969, US Published Patent Application No. US 2010-0150434 A1; and US Provisional Application Nos. 61/693,106, filed Aug. 24, 2012, 61/716,591, filed Oct. 21, 2012, and 61/719,920, filed Oct. 29, 2012.

The above patent documents are hereby incorporated herein by reference in their entirety.

TECHNICAL FIELD

The present invention relates generally to steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

One possible combination of the inventive teaching is a method including: receiving a color image or video; transforming the color image or video signal by separating the color image or video into at least first data representing a first color channel of the color image or video and second data representing a second color channel of the color image or video, where the first data comprises a digital watermark signal embedded therein and the second data comprises the digital watermark signal embedded therein with a signal polarity that is inversely related to the polarity of the digital watermark signal in the first data; subtracting the second data from the first data to yield third data; using at least a processor or electronic processing circuitry, analyzing the third data to detect the digital watermark signal; once detected, providing information associated with the digital watermark signal.

Another combination is a method including: obtaining first data representing a first chrominance channel of a color image or video, where the first data comprises a watermark signal embedded therein; obtaining second data representing a second chrominance channel of the color image or video, the second data comprising the watermark signal embedded therein but with a signal polarity that is inversely related to the polarity of the watermark signal in the first data; combining the second data with the first data in manner that reduces image or video interference relative to the watermark signal, said act of combining yielding third data; using at least a processor or electronic processing circuitry, processing the third data to obtain the watermark signal; once obtained, providing information associated with the watermark signal.

Still another combination is an apparatus comprising: a processor or electronic processing circuitry to control: (a) handling of first data representing a first color channel of a color image or video, where the first data comprises a watermark signal embedded therein; (b) handling of second data representing a second color channel of the color image or video, the second data comprising the watermark signal embedded therein but with a signal polarity that is inversely related to the polarity of the watermark signal in the first data; (c) combining the second data with the first data in manner that reduces image or video interference relative to the watermark signal, the combining yielding third data; (d) processing the third data to obtain the watermark signal; and (e) once obtained, providing information associated with the watermark signal.

Yet another possible combination is a method including: a method including: obtaining first data representing a first chrominance channel of a color image or video signal; obtaining second data representing a second chrominance channel of the color image or video signal; using a processor or electronic processing circuitry, embedding a watermark signal in the first data with a first signal polarity; using a processor or electronic processing circuitry, transforming the second data by embedding the watermark signal in the second data so that when embedded in the second data the watermark signal comprises a second signal polarity that is inversely related to the first signal polarity of the watermark signal in the first data; combining the watermarked first data and the watermarked second data to yield a watermarked version of the color image or video signal, whereby during detection of the watermark signal from the watermarked version of the color image or video signal, the second data is combined with the first data in a manner that reduces image or video signal interference relative to the watermark signal.

Still a further combination is a digital watermarking method comprising: using a programmed electronic processor, modeling a first color ink and a second color ink in terms of CIE Lab values; modulating the values with a watermarking signal; scaling the modulated values in a spatial frequency domain; spatially masking the scaled, modulated values; providing the spatially masked, scaled, modulated values, such values carrying the watermark signal.

Further combinations, aspects, features and advantages will become even more apparent with reference to the following detailed description and accompanying drawing.

BRIEF DESCRIPTION OF THE DRAWINGS

FIG. 25 shows visibility (left panel) and Robustness (right panel) maps produced from Trial 6.

DETAILED DESCRIPTION

The following disclosure discusses a digital watermarking technique that utilizes at least two chrominance channels (also called "color planes," "color channels" and/or "color direction"). Chrominance is generally understood to include information, data or signals representing color components of an image or video. In contrast to a color image or video, a grayscale (monochrome) image or video has a chrominance value of zero.

Figure 1:
FIG. 1 represents a color image.
Figure 2:
FIG. 2 represents a first color channel ('a' channel) of the color image representation shown in FIG. 1.
Figure 3:
FIG. 3 represents a second color channel ('b' channel) of the color image representation shown in Fig.

Media content that includes a color image (or color video) is represented in FIG. 1. An industry standard luminance and chrominance color space is called "Lab" (for Lightness (or luminance), plus 'a' and 'b' color channels) that can be used to separate components of images and video. FIG. 2 is an 'a' channel representation of FIG. 1 (shown in grayscale), and FIG. 3 is a 'b' channel representation of FIG. 1 (shown in grayscale). Of course, our inventive methods and apparatus will apply to and work with other color schemes and techniques as well. For example, alternative luminance and chrominance color schemes include "Yuv" (Y=luma, and 'u' and 'v' represent chrominance channels) and "Ycc." (also a dual chrominance space representation).

Figure 4:
FIG. 4 is a representation of the sum of the first color channel of FIG. 2 and the second color channel of FIG. 3 (e.g., a+b).
Figure 5:
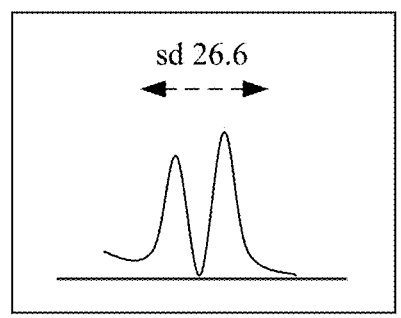
FIG. 5 is a graph showing a histogram standard deviation of FIG. 4.
Figure 6:
FIG. 6 is a representation of the difference between the first color channel of FIG. 2 and the second color channel of FIG. 3 (a−b).
Figure 7:
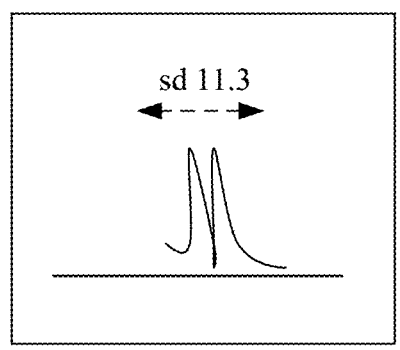
FIG. 7 is a graph showing a histogram standard deviation of FIG. 6.

Let's first discuss the additive and subtractive effects on FIGS. 2 and 3. FIG. 4 illustrates a representation of the result of adding the 'a' channel (FIG. 2) with the 'b' channel (FIG. 3). FIG. 6 illustrates a representation of the result of subtracting the 'b' channel (FIG. 3) from the 'a' channel (FIG. 2). The result of subtracting the 'b' channel from the 'a' channel yields reduced image content relative to adding the two channels since the 'a' and 'b' color planes have correlated image data in the Lab scheme. (In typical natural imagery, the 'a' and 'b' chrominance channels tend to be correlated. That is to say where 'a' increases, 'b' also tends to increase. One measure of this is to measure the histogram of the two chrominance planes when they are added (see FIG. 5), and compare that to the histogram when the two color planes are subtracted (see FIG. 7). The fact that the standard deviation of FIG. 7 is about half that of FIG. 5 also supports this conclusion, and illustrates the reduction in image content when 'b' is subtracted from 'a'.) In this regard, FIG. 4 provides enhanced or emphasized image content due to the correlation. Said another way, the subtraction of the FIG. 3 image from FIG. 2 image provides less image interference or reduces image content. The histogram representations of FIG. 4 and FIG. 6 (shown in FIGS. 5 and 7, respectively) further support this conclusion.

Now let's consider watermarking in the context of FIGS. 2 and 3.

In a case where a media signal includes (or may be broken into) at least two chrominance channels, a watermark embedder may insert digital watermarking in both the 'a' color direction (FIG. 2) and 'b' color direction (FIG. 3). This embedding can be preformed in parallel (if using two or more encoders) or serial (if using one encoder). The watermark embedder may vary the gain (or signal strength) of the watermark signal in the 'a' and 'b' channel to achieve improved hiding of the watermark signal. For example, the 'a' channel may have a watermark signal embedded with signal strength that greater or less than the watermark signal in the 'b' channel. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equations 1 and 2.

$$WMa = a(\text{channel}) + wm \quad (1)$$

$$WMb = b(\text{channel}) - wm \quad (2)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained (from optical scan data, memory, transmission channel, etc.), and data representing the color image is communicated to a watermark detector for analysis. The detector (or a process, processor or electronic processing circuitry used in conjunction with the detector) subtracts WMb from WMa resulting in WMres as shown below:

$$WMres = WMa - WMb \quad (3)$$

$$WMres = (a + wm) - (b - wm) \quad (4)$$

$$WMres = (a - b) + 2*wm \quad (5)$$

This subtraction operation yields reduced image content (e.g., FIG. 6) as discussed above. The subtraction or inverting operation of the color channels also emphasizes or increases the watermark signal (2*wm), producing a stronger watermark signal for watermark detection. Indeed, subtracting the color channels increases the watermark signal-to-media content ratio: WMres=(a−b)+2*wm.

Figure 8:
FIG. 8 is an image representation of the difference between the first color channel of FIG. 2 (including a watermark signal embedded therein) and the second color channel of FIG. 3 (including the watermark signal embedded therein).
Figure 9:
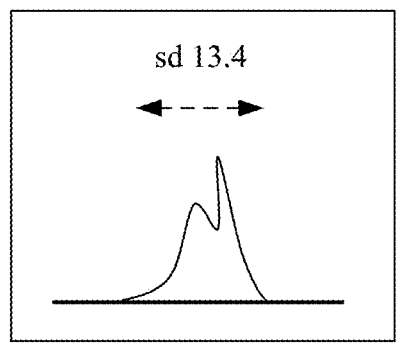
FIG. 9 is a graph showing a histogram standard deviation of FIG. 8.

FIG. 8 illustrates the result of equation 5 (with respect to watermarked versions of FIG. 2 and FIG. 3). As shown, the perceptual "graininess" or "noise" in the image corresponds to the emphasized watermark signal. The image content is also reduced in FIG. 8. A histogram representation of FIG. 8 is shown in FIG. 9 and illustrates a favorable reduction of image content.

A watermark detector may extract or utilize characteristics associated with a synchronization signal (if present) from a frequency domain representation of WMres. The detector may then use this synchronization signal to resolve scale, orientation, and origin of the watermark signal. The detector may then detect the watermark signal and obtain any message or payload carried thereby.

To even further illustrate the effects of improving the watermark signal-to-media content ratio with our inventive processes and systems, we provide some additive and subtractive examples in the content of watermarking.

For the following example, a watermark signal with the same polarity is embedded in each of the 'a' color channel and the 'b' color channel. The same signal polarity is represented by a plus ("+") sign in equations 6 and 7.

$$WMa = a + wm \quad (6)$$

$$WMb = b + wm \quad (7)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained, and data representing the color image is communicated to a watermarked detector for analysis. The detector (or a process, processor, or electronic processing circuitry used in conjunction with the detector) adds the 'a' and 'b' color channels to one another (resulting in WMres) as shown below:

$$WMres = WMa + WMb \quad (8)$$

$$WMres = (a + wm) + (b + wm) \quad (9)$$

$$WMres = (a + b) + 2*wm \quad (10)$$

This addition operation results in increased image content (e.g., FIG. 4). Indeed, image interference during watermark detection will be greater since the two correlated 'a' and 'b' color channels tend to reinforce each other.

By way of further example, if WMb is subtracted from WMa (with watermark signals having the same polarity), the following results:

$$WMres = WMa - WMb \quad (11)$$

$$WMres = (a + wm) - (b + wm) \quad (12)$$

$$WMres = (a - b) + \approx 0*wm \quad (13)$$

A subtraction or inverting operation in a case where a watermark signal includes the same polarity decreases image content (e.g., FIG. 4), but also significantly decreases the watermark signal. This may result in poor—if any—watermark detection.

Figure 10A:
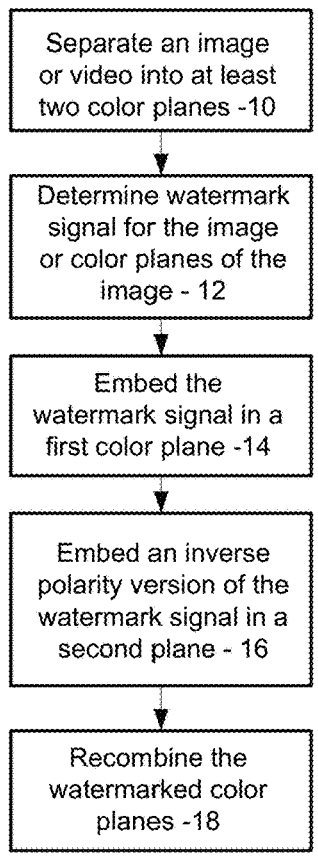
FIGS. 10a and 10b are block diagrams showing, respectively, an embedding process and a detection process.
Figure 10B:
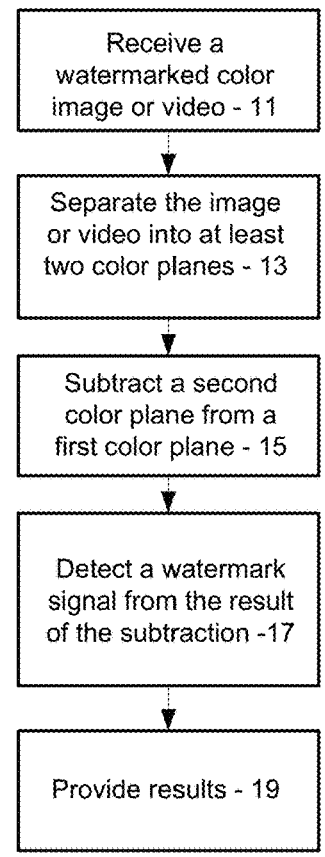

FIGS. 10a and 10b are flow diagrams illustrating some related processes and methods. These processes may be carried out, e.g., via a computer processor, electronic processing circuitry, printer, handheld device such as a smart cell phone, etc.

With reference to FIG. 10a, a color image (or video) is obtained and separated into at least two (2) color channels or planes (10). A watermark signal is determined for the color image or video (12). Of course, the watermark signal for the color image or video may be determined prior to or after color plane separation. The determined watermark signal is embedded in a first of the color planes (14). An inverse polarity version of the watermark signal is embedded in a second color plane. The color planes are recombined (perhaps with data representing luminance) to form a composite color image.

With reference to FIG. 10b, a watermarked color image or video is obtained or received (11). The color image (or video) has or can be separated into at least two (2) color planes or channels (13). A first color plane includes a watermark signal embedded therein. A second color plane includes the watermark signal embedded therein with a polarity that is inversely related to the watermark signal in the first color plane. The watermarked second color plane is subtracted from the watermarked first color (15). The result of the subtraction is analyzed to detect the watermark signal. A detected watermark message, signal or payload can be provided (19), e.g., to a remote database to obtain related metadata or information, to a local processor, for display, to a rights management system, to facilitate an online transaction, etc.

In addition to the Lab color scheme discussed above, a watermark signal may be embedded in color image (or video) data represented by RGB, Yuv, Ycc, CMYK or other color schemes, with, e.g., a watermark signal inserted in a first chrominance direction (e.g., red/green direction, similar to that discussed above for the 'a' channel) and a second chrominance direction (e.g., a blue/yellow direction, similar to that discussed above for the 'b' channel). For watermark signal detection with an alternative color space, e.g., an RGB or CMYK color space, an image can be converted to Lab (or other color space), or appropriate weights of, e.g., RGB or CMY channels, can be used. For example, the following RGB weights may be used to calculate 'a'−'b': Chrominance Difference=0.35*R−1.05*G+0.70*B+128, where R, G and B are 8-bit integers.

Further Considerations of Video

The human contrast sensitivity function curve shape with temporal frequency (e.g., relative to time) has a very similar shape to the contrast sensitivity with spatial frequency.

Successive frames in a video are typically cycled at about at least 60 Hz to avoid objectionable visual flicker. So-called "flicker" is due to the high sensitivity of the human visual system (HVS) to high temporal frequency changes in luminance. The human eye is about ten (10) times less sensitive to high temporal frequency chrominance changes.

Figure 11:
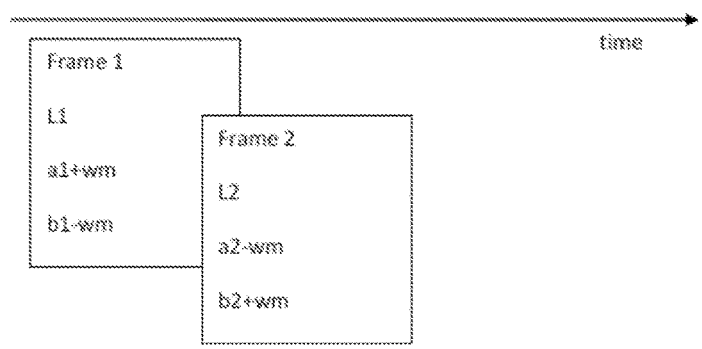
FIG. 11 is a diagram showing watermarks embedded in first and second video frames.

Consider a video sequence with frames as shown in FIG. 11. A chrominance watermark can be added to frame 1 per the above description for images. In a similar way, a watermark is added to frame 2 but the polarity is inverted as shown in FIG. 11.

In order to recover the watermark, pairs of frames are processed by a watermark detector, and the 'a' channels are subtracted from each other as shown below.

$$Det\_a = (a1+wm) - (a2-wm) = (a1-a2) + 2*wm \quad (14)$$

Det_a refers to watermark detection processing of the 'a' channel. Because of the temporal correlation between frames, the image content in equation 14 is reduced while the watermark signal is reinforced.

In a similar way the 'b' channels are also subtracted from each other $$Det\_b = (b1-wm) - (b2+wm) = (b1-b2) - 2*wm \quad (15)$$

Det_a refers to watermark detection processing of the 'b' channel. Equation 14 and 15 are then subtracted from each other as shown below in equation 16.

$$Det\_a - Det\_b = (a1-a2+2*wm) - (b1-b2-2*wm) = (a1-a2) - (b1-b2) + 4*wm \quad (16)$$

In generally, related (but not necessarily immediately adjacent) frames will have spatially correlated content. Because of the spatial correlation between the 'a' and 'b' frames, the image content is reduced while the watermark signal is reinforced. See equation 16.

For any one pair of frames selected by a watermark detector, the polarity of the watermark could be either positive or negative. To allow for this, the watermark detector may examine both polarities.

Watermark Embedding for Spot Colors

Product packaging is usually printed in one of two ways:
1. Process color printing using cyan, magenta yellow and/or black (CMYK)
2. Spot color printing (e.g., using special Pantone color or other ink sets)

The majority of packaging is printed using spot colors mainly for reasons of cost and color consistency, and to achieve a wide color gamut over various packaging. Some conventional watermarking techniques embed digital watermarks in either CMYK for printed images or RGB for digital images that are being displayed. But how to embed a watermark with a spot color?

An improvement addresses problem associated with watermarking spot color images. Preferably, packaging contains two (2) or more spot colors (e.g., printed cooperatively to achieve a certain color consistency). Each different color is altered to collectively carry a watermark signal. A maximum signal strength within a user selectable visibility constraint with watermark in at least two (2) of the spot.

A maximized watermark signal is embedded preferably by modulating the spot color inks within a certain visibility constraint across the image. The approach models a color (ink) in terms of CIE Lab values. Lab is a uniform perceptual color space where a unit difference in any color direction corresponds to an equal perceptual difference.

The Lab axes are then scaled for the spatial frequency of the watermark being added to the image, in a similar manner to the Spatial CieLab model by X. Zhang and B. A. Wandell, e.g., "A spatial extension of CIELAB for digital color image reproduction," in Proceedings of the Society of Information Display Sumposium (SID '96), vol. 27, pp. 731-734, San Jose, Calif., USA, June 1996. This is a uniform perceptual color space which we will call SLAB, where a unit difference in any color direction corresponds to an equal perceptual difference due to the addition of a watermark signal at that spatial frequency.

The allowable visibility magnitude in SLAB is scaled by spatial masking of the cover image. Spatial masking of the cover image can include the techniques described by Watson in US Published Patent Application No. US 2006-0165311 A1, which is hereby incorporated by reference in its entirety, and can be used to scale the allowable visibility across the image. This is a uniform perceptual color space which we will call VLAB, where the visibility circle is scaled to correspond to an equal perceptual difference due to the addition of a watermark signal at that spatial frequency for that particular image.

The chrominance embedding techniques discussed above forms the foundation for the present watermark embedding techniques. Bradley et al. (Appendix A, which is hereby incorporated by reference in its entirety with excerpts reproduced below under the heading "Chrominance watermark embed using a full color visibility model") further developed this work to use an iterative embed technique to insert the maximum watermark signal into CMYK images.

The spot color technique described extends this work to embedding that supports special color inks (e.g., spot colors) used in packaging and uses a full color visibility model with spatial masking. A geometric enumerated embed approach can be used to evaluate a range of possible ink changes, which meet the user selected visibility constraint and press constraints. The set of allowable ink changes are evaluated to choose the pair of ink changes which result in the maximum signal strength while meeting the visibility and press constraints.

Figure 12:
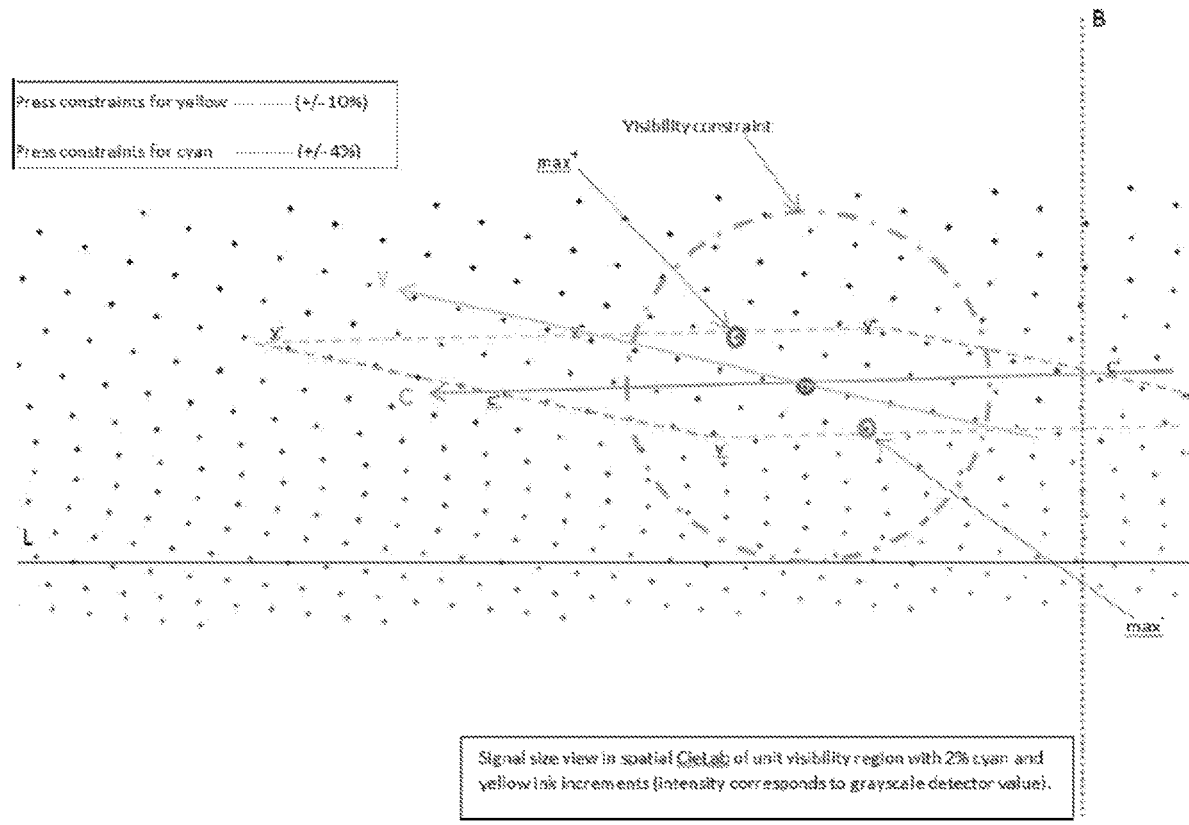
FIG. 12 is a diagram showing a detailed signal size view with ink increments of 2%, and the addition of press visibility constraints.

FIG. 12 shows a detailed signal size view with ink increments of 2%, and the addition of press constraints.

A user can insert a maximum watermark signal, while meeting any pre-required visibility constraint. The method has been applied to the case of two spot colors and images have been produced which are more than twice as robust to Gaussian noise as a single color image which is embedded using a luminance only watermark to the same visibility.

A method has been described which allows an image containing 2 or more spot colors to be embedded with a watermark in 2 of the spot colors, with the maximum signal strength within a user selectable visibility constraint.

A look-up table based approach can be used for given colors at given locations, and can easily be extended to 3 or more dimensions while still being computationally reasonable.

Additional related disclosure is found in Appendix B & Appendix C, which are each hereby incorporated herein by reference in its entirety.

Excerpts from Appendix B are reproduced below under the heading "Geometric Enumerated Chrominance Watermark Embed for Spot Colors." Excerpts from Appendix C are reproduced below under the heading "Watermark Embedding in Optimal Color Direction."

Chrominance Watermark Embed Using a Full Color Visibility Model.

ABSTRACT: A watermark embed scheme has been developed to insert a watermark with the maximum signal strength for a user selectable visibility constraint. By altering the watermark strength and direction to meet a visibility constraint, the maximum watermark signal for a particular image is inserted. The method consists of iterative embed software and a full color human visibility model plus a watermark signal strength metric.

The iterative approach is based on the intersections between hyper-planes, which represent visibility and signal models, and the edges of a hyper-volume, which represent output device visibility and gamut constraints. The signal metric is based on the specific watermark modulation and detection methods and can be adapted to other modulation approaches. The visibility model takes into account the different contrast sensitivity functions of the human eye to L, a and b, and masking due to image content. Keywords: Chrominance watermark, iterative embed, signal strength and color visibility model.

1. Introduction

In Digimarc Discover an imperceptible watermark is added to images which can be read by a broad range of cell phone cameras. For this application, a chrominance watermark is used which allows a low visibility watermark to be used and is detectable by a cell phone camera with inherently low resolution and high noise levels.

The aim in image watermarking is to insert a watermark signal into a cover image such that the maximum watermark signal compared to noise is achieved under a certain visibility constraint. A cover image can be considered as a source of noise, and the use of a local image visibility model together with a local strength metric allows the maximum watermark signal to noise to be achieved for each pixel of the image.

2. What are all these Maps?

Our implementation of embedding operates upon and produces "maps". There are three different maps of interest and each of these is described in terms of the native image dimensions (H, W, nC) of the image to be watermarked. H is the image height, W is the image width, and nC is the number of channels.

Embedding Map—An H×W×nC map that contains the watermark gain applied to each pixel in each channel during embedding.

Visibility Map—an H×W map that is an estimate of how visible the embedded watermark is at each pixel in the watermarked image.

Robustness Map—an H×W map that is an estimate of how durable the embedded watermark is at each pixel in the watermarked image.

Figure 13:
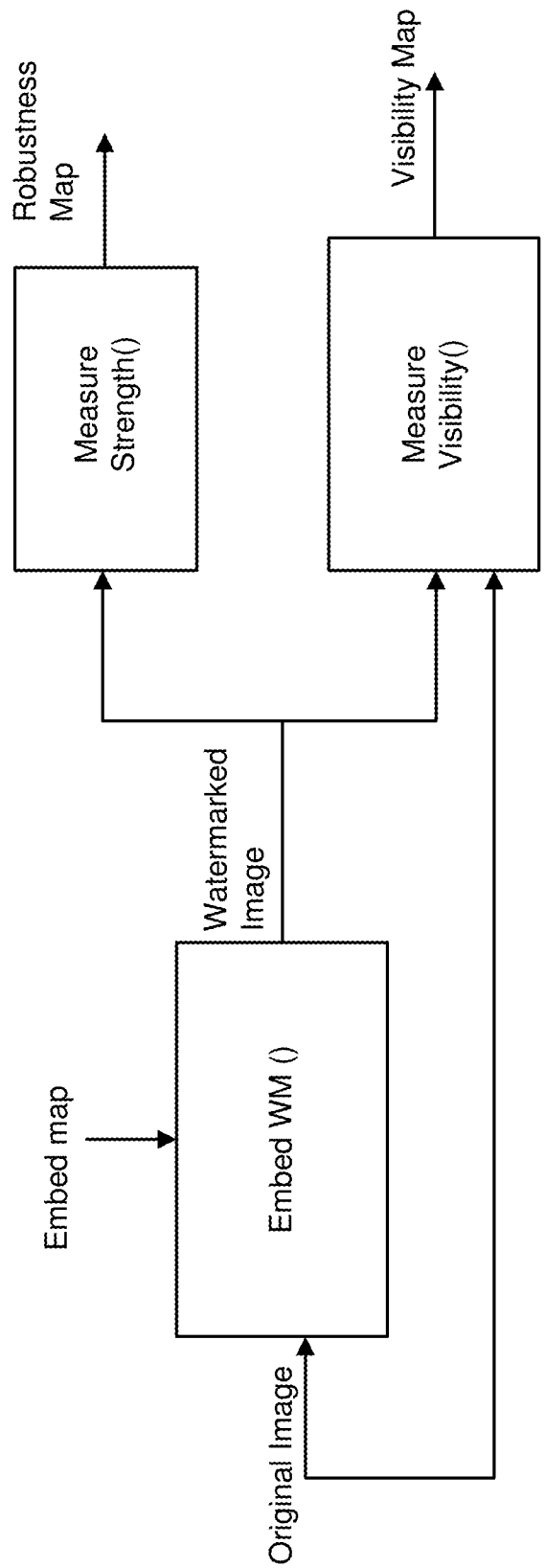
FIG. 13 is a block diagram for a characterization of map generation.

An example of a process that involves the maps is shown in FIG. 13. An original image is embedded in accordance with the Embedding map to produce a watermarked version of the image. Following the embedding of the watermark, we characterize how well the watermark is embedded in the image. The strength of the watermark is measured at every pixel in the watermarked image to produce a robustness map. The visibility is assessed at every pixel in the watermarked image, using the original image as a reference, to produce a visibility map. Note that the characterization maps (robustness and visibility maps) are single channel maps, while the embedding map has the same number of channels as the original image. The characterization maps usually show some deficiency in the watermarked image after the initial embedding. For example, some areas of the image may show the watermark much more than other areas do. We use the characterization maps to iteratively refine the embedding map, progressively producing less deficient versions of the watermarked image.

3. Process Flow

Figure 14:
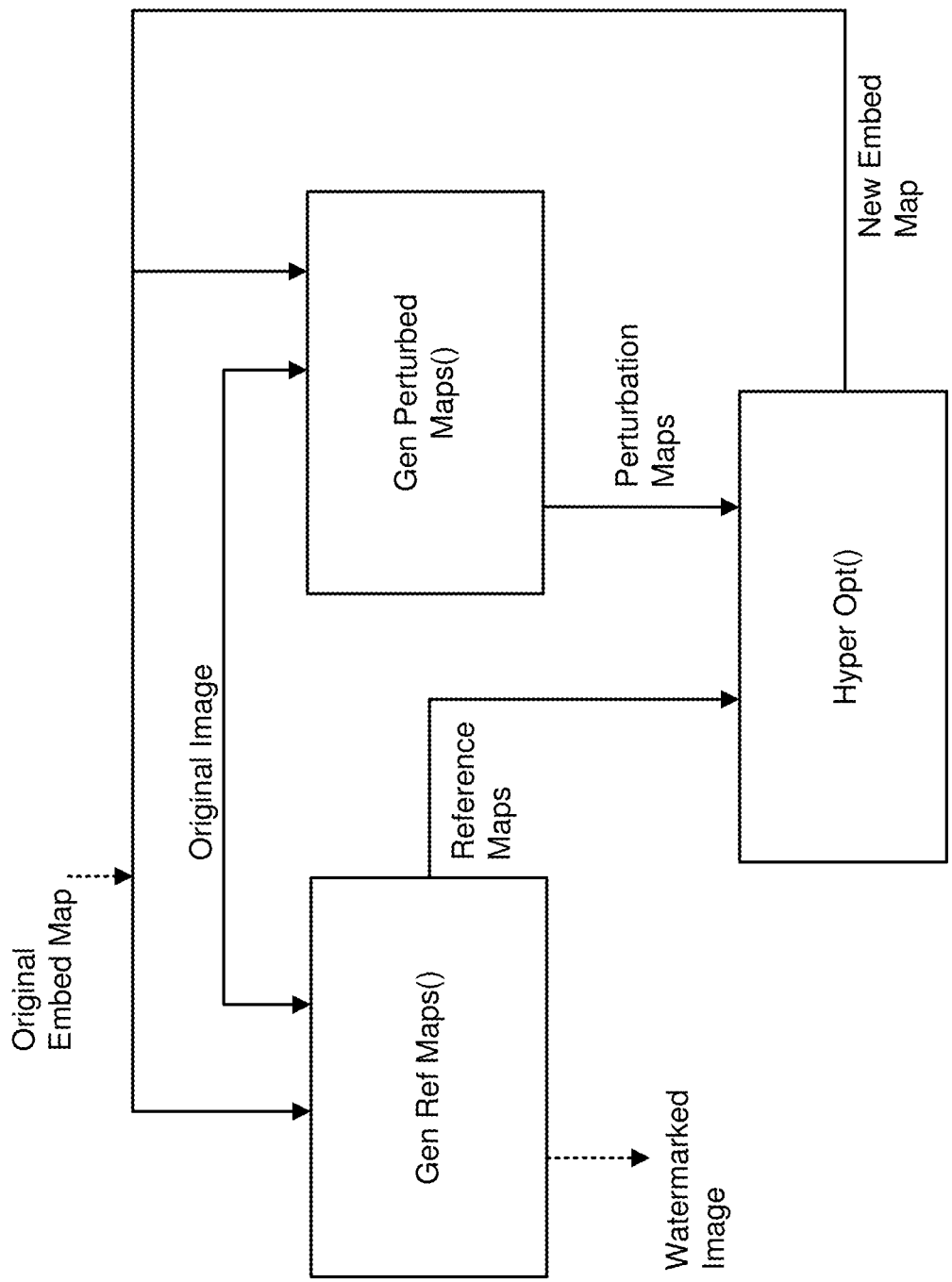
FIG. 14 is a block diagram showing a high level iterative embedding process.

FIG. 14 shows the iterative embedding procedure at a very high level. As is evident by the prominence of the title "embedding map," the main purpose of the embedding procedure is to refine an original embedding map through a process of continual adaptation, based upon feedback from characterization maps A watermarked image is simply a byproduct of the process (hence the dotted line output).

There are three critical blocks in the diagram. The first of these, "Gen Characterization Maps," has already been described in the previous section (see FIG. 13 and corresponding text). It takes two inputs, an unmarked image and an embedding map. Its output is a pair of characterization maps and the watermarked image. In this case, the characterization maps are reference maps. The reference maps are used as a baseline to be compared against characterization maps arising from the embedding of various perturbed versions of the embed map. The next block is entitled "Gen Perturbed Maps" and its inputs are exactly the same as those of "Gen Ref Maps." Its output, unsurprisingly enough, is a set of perturbation maps. This set of maps also contains robustness maps and visibility maps, but unlike the "Gen Ref Maps" block, the set contains one robustness map and one visibility map per image channel. The final block of note is "Hyper Opt." It operates upon the reference maps and perturbation maps to produce a new embedding map.

Figure 15:
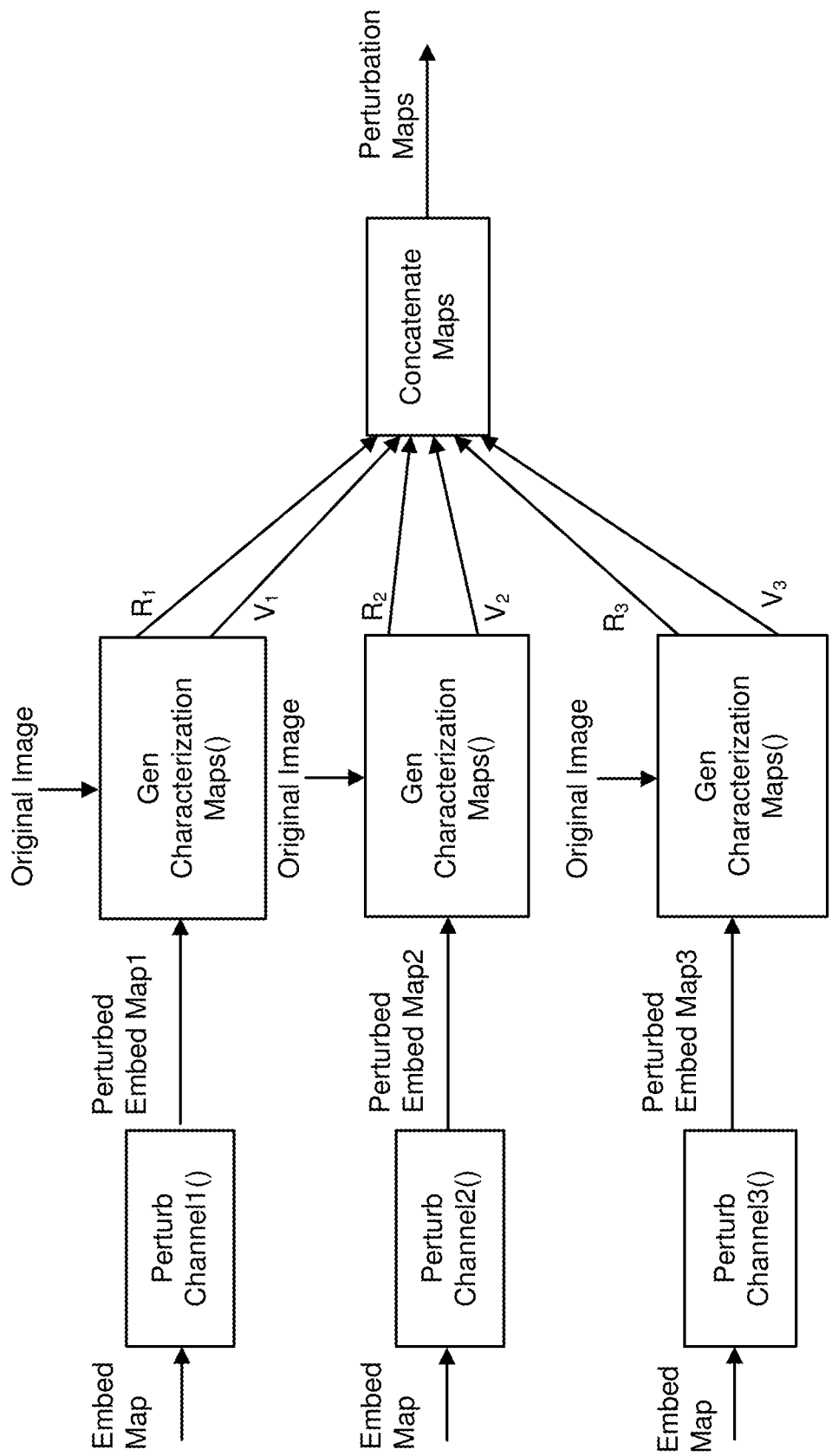
FIG. 15 is a block diagram showing the configuration of the "Gen Perturbed Maps" block of FIG. 14.

FIG. 15 depicts the inside configuration of the "Gen Perturbed Maps" block of FIG. 14. There are three nearly identical sections that lead to the "Concatenate Maps" block. Each of these has a "Gen Characterization Maps" block, which is preceded by a block called "Perturb Channel n". The variable n runs from 1 to 3 when the image has three color channels. "Perturb Channel n" operates only upon the nth channel of the Embedding Map by making a small change in the direction of the watermark signal on all the values in the map for that channel. The idea is to measure how changes in each channel affect visibility and robustness separately. Once the characterization maps in each of the three sections are generated (R1, V1, R2, V2 R3, V3), they are packaged into the set of Perturbation maps via the "Concatenate Maps" block.

4. Visibility and Robustness Evaluation 4.1 Visibility Model

Most visibility models used in watermarking technology only consider perceptual errors caused by changes in the luminance channel of the image. In this paper we use chrominance changes and a full color HVS model. For the purposes of the experiments we describe below how we have used a simplified model that weights the visibility of luminance changes more strongly than chrominance changes.

In future work this simplified model will be replaced by an HVS model of the form described below. The model is based on the spatial CieLab model of Wandell (Wandell, B. A and Zhang, X. M., "A spatial extension to CieLab for digital color image reproduction", Proceedings of the SID Symposiums, (1996)), together with an image masking component described by A. B. Watson. An incoming original or watermarked RGB image is transformed to Lab space using an ICC profile. The L, a and b components of the images are converted to contrast and filtered by the human contrast sensitivity functions for L, a and b, respectively.

Image masking will be limited to the luminance component of the cover image, since the luminance is dominant for the images in our application.

4.2 Robustness Evaluation

Rather than describe our approach to robustness evaluation in detail, we opt to discuss the most salient points of the procedure.

The measure is local, not global. For hyperplane optimization, we need a descriptor of watermark robustness that is at pixel granularity. Since a watermark typically has very low SNR compared to the Cover Work (host image that the watermark is embedded into, see Ingemar J. Cox, Matthew A. Miller, Jeffrey L. Bloom, Jessica Fridrich and Ton Kalker, [Digital Watermarking and Steganography], Morgan Kaufmann, (2008)]), asking whether the watermark survives at any given pixel location is practically meaningless, let alone evaluating how robustly it survives. Instead of querying about survivability, we ask the question a different way: how much does the watermark embedded at this particular pixel location contribute to the robustness of the watermark as a whole? Even this question is difficult to ask, because it depends upon the strength of the watermark at the given location and the noise at that location, both contributed from the Cover Work and other sources.

Directionality of watermark—the gain at any given pixel location is vector-valued, with one component per color channel. Normally, a watermark detector "looks" in a particular color direction. So for the same embedded energy, a watermark that is embedded in alignment with the detector is usually more robust than a watermark that is not embedded with this alignment, depending upon the noise.

Image interference—The Cover Work is often a major source of interference for the watermark. The amount of interference presented by the Cover Work can vary greatly as a function of location in the image. Therefore, one of the principal measures of robustness evaluation should be local image interference.

Sometimes it is expected that different image color channels are corrupted by varying degrees of noise during the watermark detection operation. If these different noise levels can be quantified, robustness evaluation should account for this effect.

5. Hyperplane Optimization

The objective of hyperplane optimization is to generate a new watermark embedding map given the old map, reference measurements using the old map, and measurements taken after perturbing the old map in the different channel directions. Hyperplane optimization proceeds entirely at the pixel level and amounts to determining what new watermark gain is applied to each channel to improve the robustness and visibility contribution of that pixel. The set of new watermark gains across all pixels comprise the new embedding map.

Figure 16:
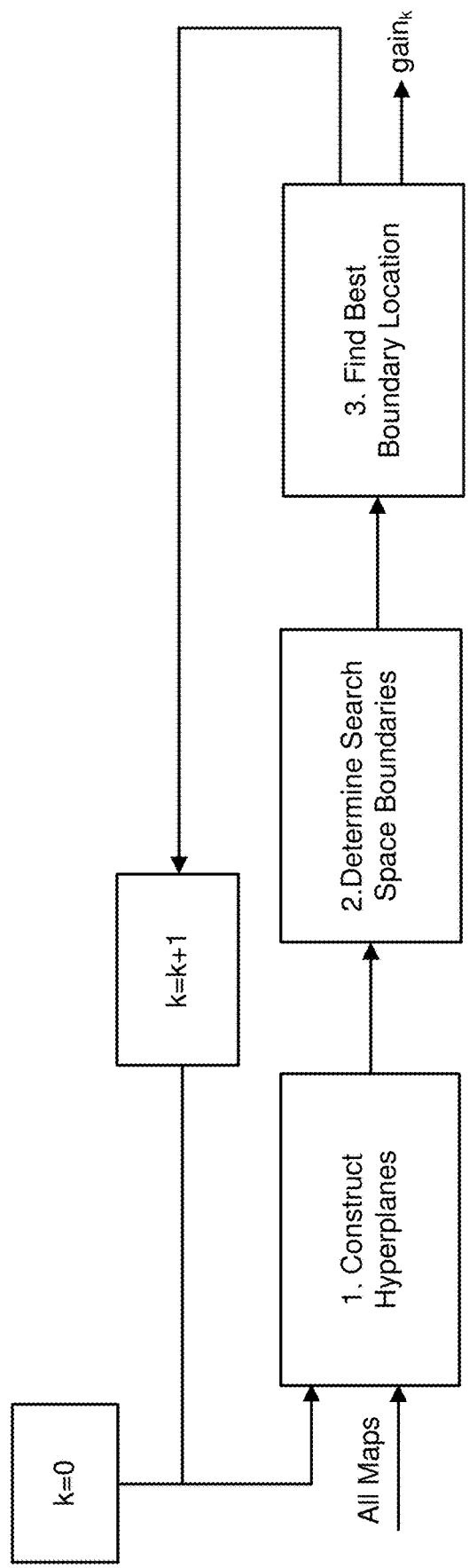
FIG. 16 is a block diagram showing the set of procedures that occur in the "Hyper Opt" block diagram in FIG. 14.

FIG. 16 shows the set of procedures that occur in the "Hyper Opt" block diagram in FIG. 14. The input to the diagram is "All Maps." These include the set of visibility and robustness perturbation maps, as well as the visibility and robustness reference maps. The process shows a loop over k in which the $k^{th}$ pixel from each of the maps is selected and operated upon. The first thing that happens in this process is that visibility and robustness hyperplane coefficients are computed from the map values. It is this pair of hyperplanes that are used to evaluate the various candidates of the search space shown in FIG. 20. We shall discuss this process in more detail shortly. The next step in the process is to determine the search space boundaries, which is a function of the gain search step size and the color gamut. This block does not require any of the hyperplane information and can hence be performed in parallel with hyperplane computation. The final step for the $k^{th}$ iteration is to find the best boundary location. To reiterate, this is a function of the visibility and robustness hyperplanes. The output of this step is a vector gain value that prescribes the new gain that is to be applied to the watermark for each channel of the $k^{th}$ pixel; i.e. it is the $k^{th}$ pixel of the new embedding map.

5.1 Hyperplane Computation

The idea behind hyperplane computation is that a small perturbation in one of the image channels should result in a change in the principal metrics (robustness and visibility) that is approximately linear. We expect this to be valid even for complicated functions of the perturbation, such as the full color visibility model. Moreover, the linear approximation allows us to evaluate changes to each of the channels separately via the applied perturbation and then use the measurements of these separate evaluations to create a linear model by solving for the coefficients of a hyperplane.

Figure 17:
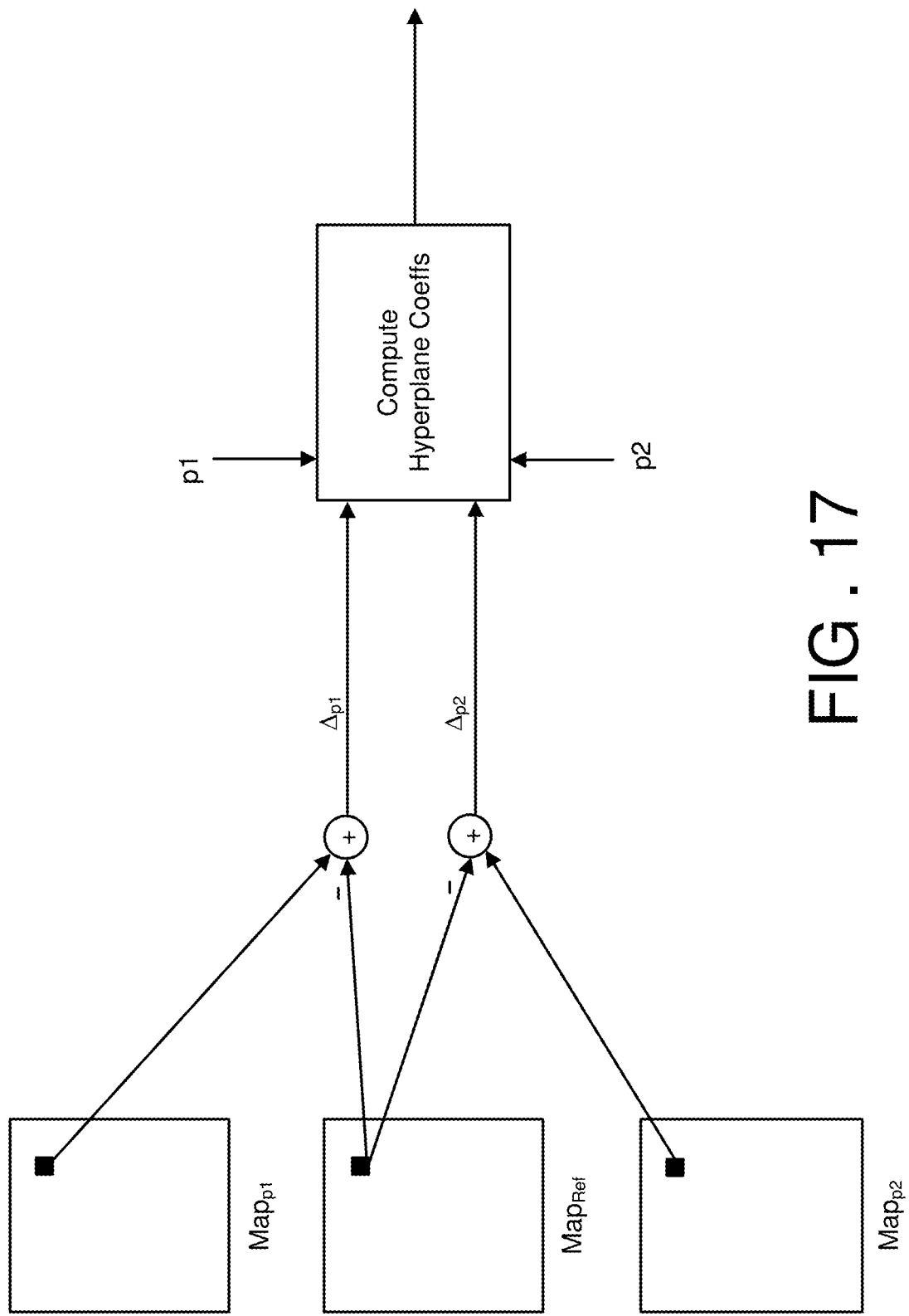
FIG. 17 illustrates the procedure of computing hyperplane coefficients from map values.

FIG. 17 illustrates the procedure of computing hyperplane coefficients from map values. For simplicity, we show the case of a two-channel image. The process is analogous for three and four channel imagery. On the far left of the diagram is a series of maps, one reference map and two perturbation maps. The exact same procedure is applied to both visibility and robustness maps. So we have generalized the diagram by not applying visibility or robustness labels to the maps. The hyperplane computation occurs on a per pixel basis. To this end, each map is shown to have a red square (pixel) that is extracted and operated upon. The pixels in each map have the same row/column index. After extraction, the perturbation map values are subtracted from the reference map value, producing $\Delta p1$ and $\Delta p2$. These numbers represent the changes in the metric relative to the reference value that the perturbations of size p1, p2 in channel 1,2, respectively. The four numbers (p1, p2, $\Delta p1$, $\Delta p2$) are all that is required to compute hyperplane coefficients. We represent the equation of each hyperplane in terms of its normal vector, which is written as a function of the perturbations in equation 17.

$$\text{hpNorm}_{Vis} = \{\Delta p_{1,Vis}/p1, \Delta p_{2,Vis}/p1, -1\}$$

$$\text{hpNorm}_{Rob} = \{\Delta p_{1,Rob}/p1, \Delta p_{2,Rob}/p1, -1\} \qquad (17)$$

The equation illustrates that each perturbation begets a visibility and robustness measurement. For the two-channel case the hyperplanes are standard 2D planes. For more channels the extension is straightforward:

$$\text{hpNorm} = \{\Delta p_1/p1, \Delta p_2/p1, \ldots, \Delta p_n/pn, -1\}$$

5.2 Search Space Boundary Determination

Figure 18:
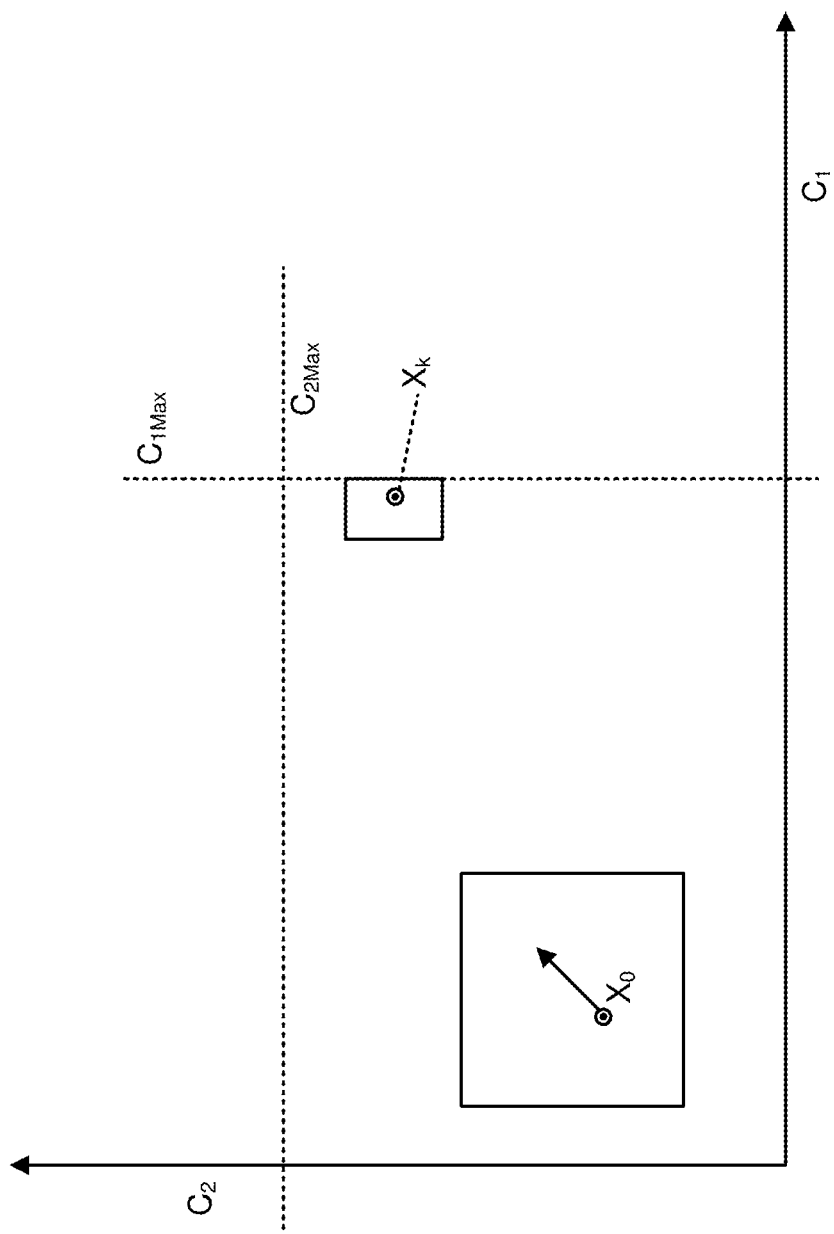
FIG. 18 is a diagram for determining search space boundaries for the case of a two-channel image.

After hyperplane computation, the next block in FIG. 16 is "Determine Search Space Boundaries." The situation is depicted in FIG. 18 for the case of a two-channel image.

The x-axis in FIG. 18 is the gain of the watermark in channel 1 and the y-axis is the gain for channel 2. The old value for the watermark gain is represented by the point $x_0$. The space of possible new values for the watermark gain is given by the perimeter of the square surrounding $x_0$, which is a function of the gain step-size for the first iteration. Also shown in the figure is a pair of dotted lines, $C_{1Max}$ and $C_{2Max}$. These lines depict the maximum watermark gain that can be applied to channel 1 and channel 2, respectively, before color saturation occurs. The perimeter of the rectangle surrounding the point $x_k$, which represents the old value for the watermark gain at the kth iteration, is the space of possible new values for the watermark gain. The space is a rectangle rather than a square because a step along the $C_1$ axis equal to that along the $C_2$ axis would violate the saturation limit for channel 1. Therefore, the step along the C1 axis is scaled back to the point at which saturation is exactly reached in channel 1. Also note that the longer dimension of the rectangle surrounding $x_k$ is shorter than the dimension of the square surrounding $x_0$. This is because we shrink the step size for the gain value search as the iterations proceed.

5.3 Finding the Best Boundary Location

Figure 19:
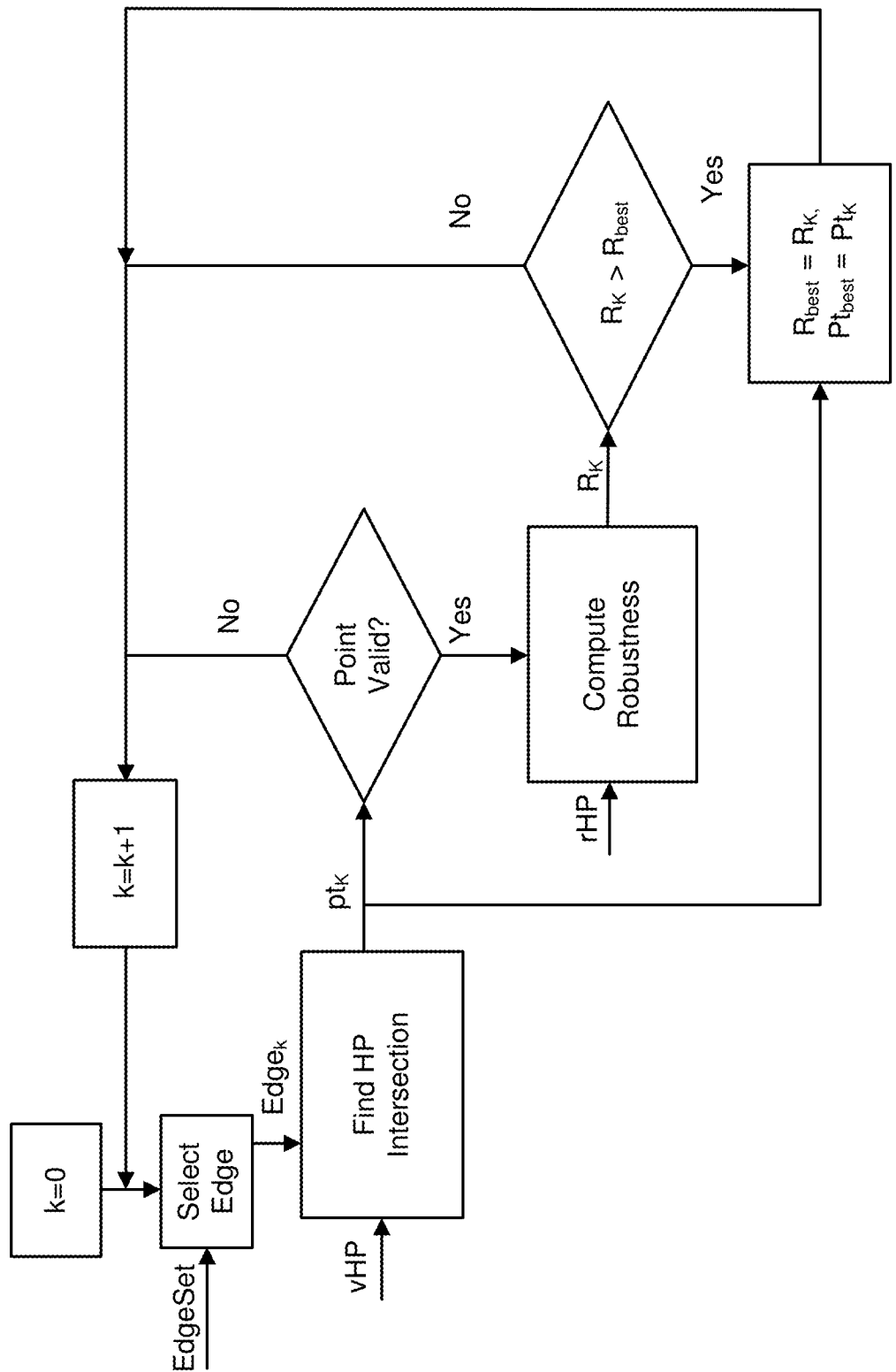
FIG. 19 is a flow diagram for finding the best boundary location.

The final block of hyperplane optimization is responsible for determining where on the boundary the watermark gain for the pixel under consideration should be moved. The series of steps that achieve this are shown in the diagram of FIG. 19.

Figure 20:
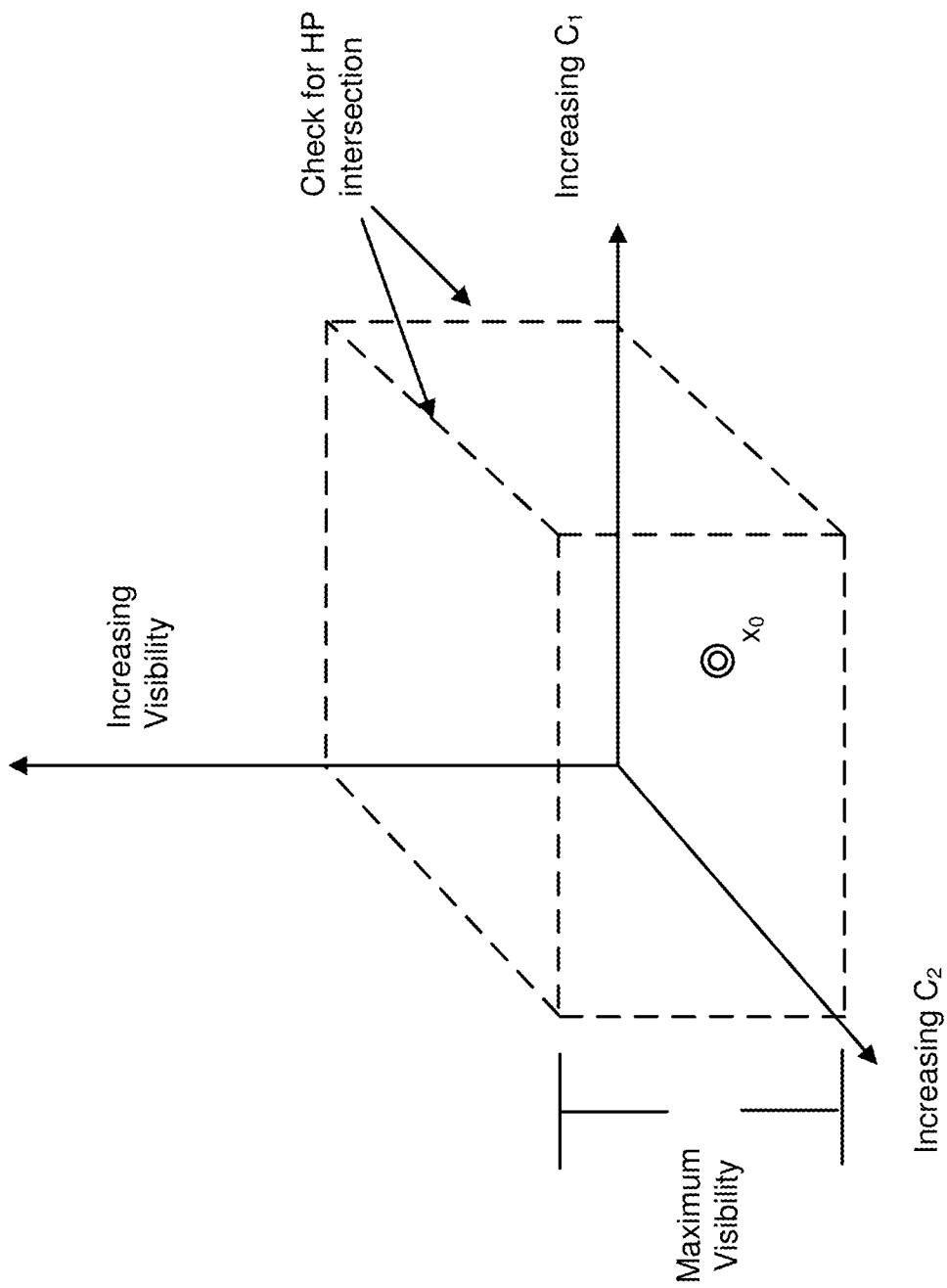
FIG. 20 illustrates a search space.

The loop in this figure is over edges of a visibility hypercube. The hypercube is of dimension C+1, where C is the number of image channels. Each of the first C dimensions corresponds to the range of the allowed new gain value for that channel. For example, the C1 dimension of the square encompassing $x_0$ and $x_k$ in FIG. 18 is the range of new allowed gain values for the cases shown. The $(C+1)^{th}$ dimension of the hypercube is the maximum allowed visibility. FIG. 20 illustrates this in more detail for the two channel case.

In FIG. 20, we see the initial gain value for the pixel $x_0$. Limits on the gain search space are depicted by the dotted lines in the C1, C2 plane. The maximum allowed visibility is given by the height of the cube. Also shown in the figure is the phrase "Check for HP intersection" with two arrows emanating from it, one pointing at vertical edge of the cube and the other pointing to a horizontal edge of the cube. This is where the loop over edges in FIG. 19 comes into play. Using the situation depicted in FIG. 20 as an example, there are a total of eight edges, four vertical and four horizontal, which are checked for intersections with the visibility hyperplane. Interpretation of the edge types and possible intersections is as follows.

Vertical edges—step taken is one of the following ($C1_{max}$, $C2_{max}$), ($-C1_{max}$, $C2_{max}$), ($C1_{max}$, $-C2_{max}$), or ($-C1_{max}$, $-C2_{max}$), where $|C1(2)_{max}|$ is the maximum magnitude of allowed step size in the color 1(2) direction. Visibility achieved is between the old value for visibility and the maximum allowed visibility depending upon where the hyperplane intersects the edge.

Horizontal edge—The maximum magnitude step is taken in exactly one of the two color directions and maximum visibility is achieved. The other color lies between its maximum and minimum values depending upon where the hyperplane intersects the edge.

The two-color case is a toy example that illustrates the concept of hyperplane optimization. Practical cases of interest have three or four color channels. Here, what was a cube in two dimensions becomes a hypercube. Table 1 shows the number of vertical and horizontal edges that are evaluated as a function of the number of channels.

TABLE 1

| Number of Channels | Vertical Edges | Horizontal Edges |
|---|---|---|
| 2 | 4 | 4 |
| 3 | 8 | 12 |
| 4 | 16 | 32 |

Given the hyperplane equation and the current edge, the intersection is found using equation 18 below.

$$d = \frac{(p_o - l_o) \cdot n}{l \cdot n} \qquad (18)$$

In equation 18, $p_0$ is a point in the hyperplane, l0 is a point on the edge, l is a vector in the direction of the edge and n is the normal vector to the hyperplane (see equation 17). Each edge is described in terms of a normalized coordinate system in the interval [0,1]. If the intersection with the hyperplane lies between zero and one, the point of intersection is valid and we evaluate the robustness of the point. If the point of intersection is not valid, we proceed to the next edge. These steps are shown in FIG. 19.

Robustness evaluation of a valid point along an edge begins with plugging the point channel coordinates into the equation for the robustness hyperplane to get an initial robustness number. The robustness number is then refined using the evaluated visibility at that point. This additional step is taken because we would like to choose the point that has the best combination of high robustness and low visibility, rather than just the most robust point. One way of doing this is to use a penalty term that reduces the robustness to a greater or lesser extent depending upon visibility, as in equation 19. The choice of alpha depends upon the relative magnitudes of the visibility and robustness metrics.

$$Rob_1 = Rob_0 - alpha*Vis \quad (19)$$

Once robustness of the point has been calculated, we move to the last two blocks in FIG. 19. The first of these is a comparator operation, which asks whether the current point's robustness is greater than any previous robustness measurement. If it is, the point's robustness value and coordinates replace the previous set of values. In either case, we proceed to evaluate the next edge. After all edges have been examined, the coordinates of the most robust point become the watermark gain contribution to the new gain map.

6. Experiments

To evaluate our method of iteratively generating embedding maps, we began with a simple visibility model based upon the mean squared error (MSE) of the difference between each watermarked image and the original. In this case we know what the ideal weights are since they can be solved analytically. By using MSE, we can compare the color weights our algorithm converges to against the ideal weights to assess whether or not the algorithm operates as expected. If it does behave as expected, there is a plausible case for believing that the algorithm should work with more complex visibility models, where a closed-form expression for the ideal answer is not available.

6.1 Experimental Apparatus and Parameters

Figure 21:
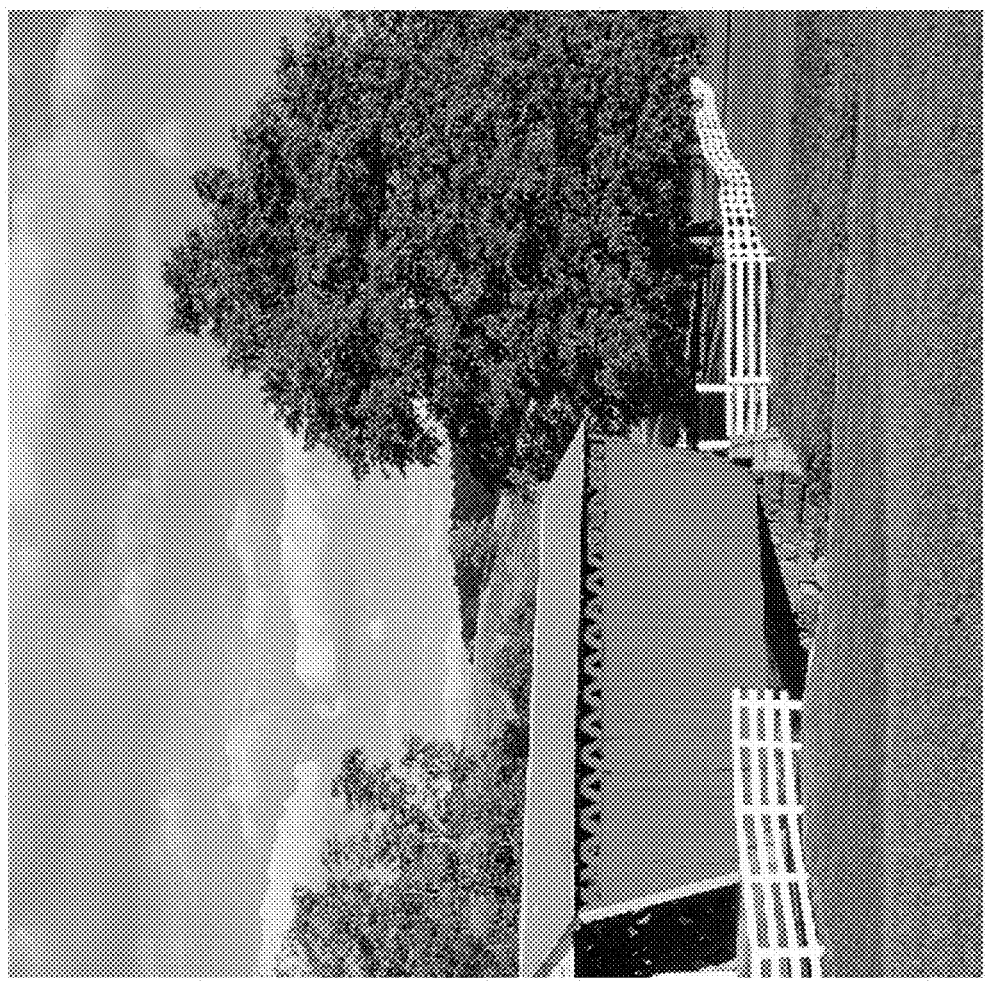
FIG. 21 is a picture of a covered bridge test image.

Used the RGB "covered-bridge" image, see FIG. 21.

Detector weights are (0.19, −0.5, 0.31), i.e. the detector expects the watermark to be embedded in the positive red direction, the negative green direction, and the positive blue direction. The weights are chosen in this fashion to minimize luminance changes, which are much more visible than chrominance changes.

The starting embedder weights are (1, 1, 1). With this choice of weights, the watermark in the green channel is embedded in the wrong direction! We expect our algorithm to correct this problem.

The three perturbations are (1,0,0), (0,1,0), and (0,0,1). We perturb each channel independently (a requirement of the algorithm), but by the same amount and in the same direction.

We perform ten iterations.

The starting step size is 3. It decreases after each iteration until reaching a minimum value of 0.65 at the $10^{th}$ iteration. The step size is reduced by progressively smaller increments as the iteration proceeds.

The maximum visibility is set to 10. If the algorithm converges properly, the measured visibility in the image should be an average of 10 with very little variation.

No units are given for the robustness measure. Higher is better.

Figure 22:
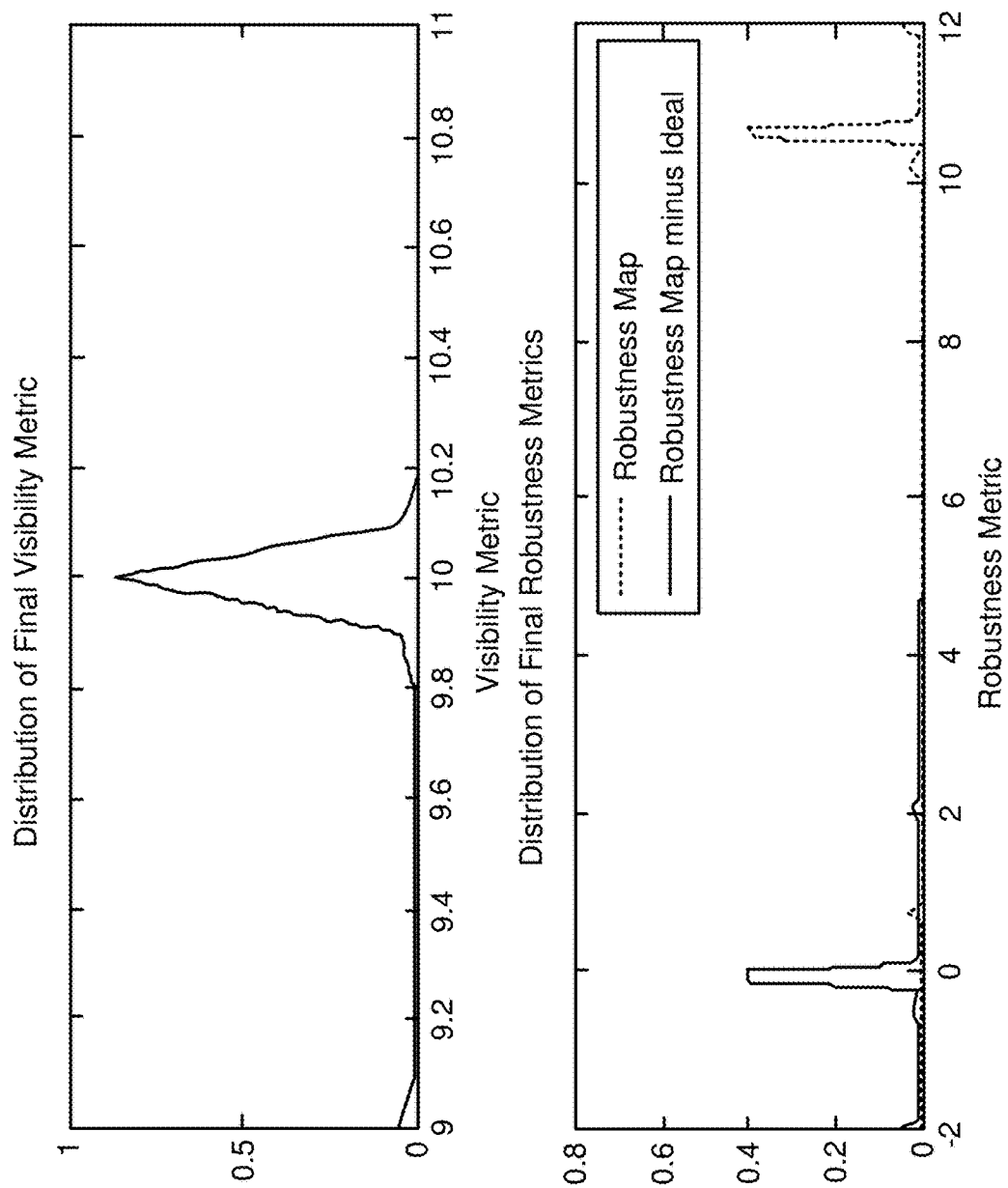
FIG. 22 shows distributions of values in final characterization maps.

FIG. 22 shows the distributions of the visibility and robustness map values obtained by applying our algorithm with the parameters described in the previous sub-section to the test Image.

The top panel of FIG. 22 shows the distribution of the visibility metric map values. The vast majority of values are tightly clustered around the target for maximum visibility (10). Also seen is a smaller distribution of values at 9.0. Actually, this cluster is comprised of all values that are less than or equal to 9.0. Some are far smaller than 9.0. The lower panel of FIG. 22 shows the distribution of robustness values in the final robustness map (blue curve). It also shows the distribution of the final robustness values minus the robustness obtained from using the ideal weights (red curve). Our conclusions are that the achieved robustness is consistent and very close to ideal. Careful observation of the red curve shows that the peak of the distribution is less than zero, meaning that on average the achieved robustness is less than the ideal case.

Figure 23:
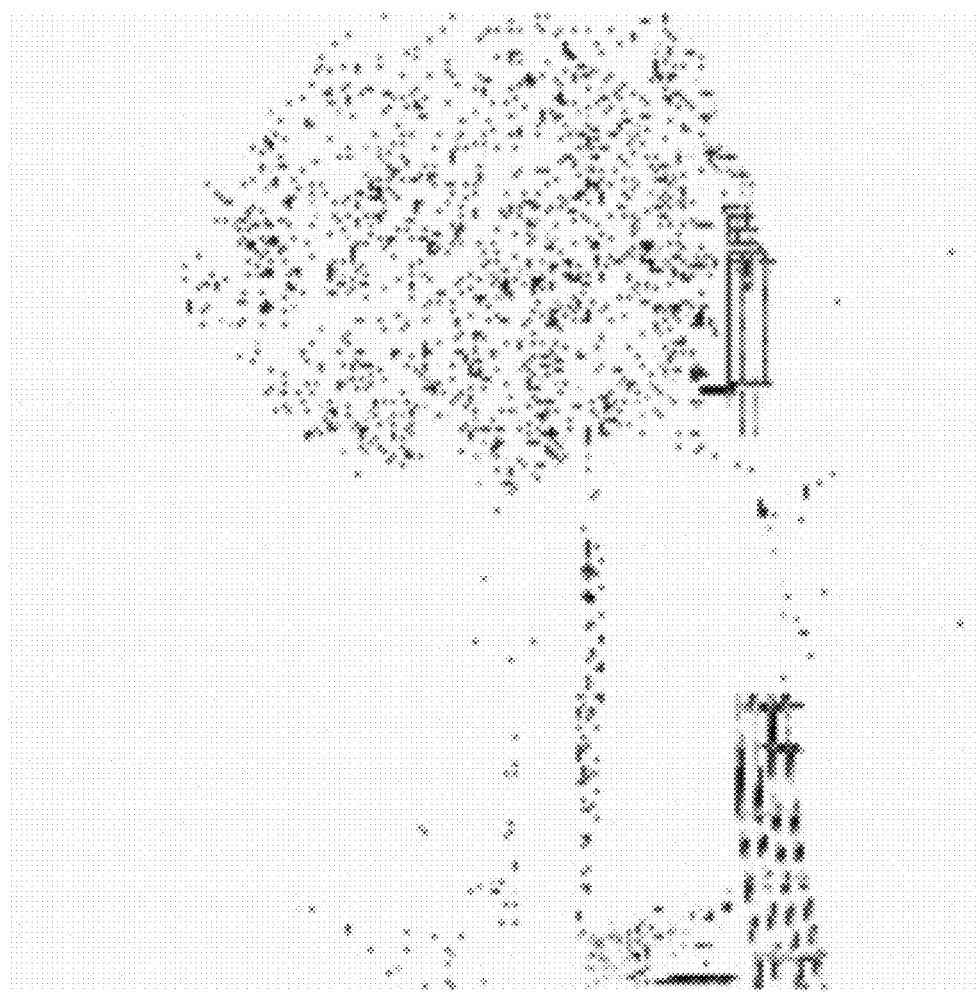
FIG. 23 shows the final visibility map for the test image in FIG. 21.

FIG. 23 is an image of the final visibility map for the test image. Whiter pixels are indicators of greater visibility. Most pixels are saturated at the maximum visibility value, 10.0. The darker pixels correspond to the clump of values at 9.0 in the top panel of FIG. 22. The majority of cases where the target visibility is not achieved occur in areas of relatively high image detail. In such areas many of the pixels reach saturation in one or more color channels when embedding a watermark with the ideal weights and a target visibility metric of 10.0. In these cases target visibility cannot be achieved unless the watermark is increased in magnitude in the other available directions (see FIG. 21).

Figure 24:
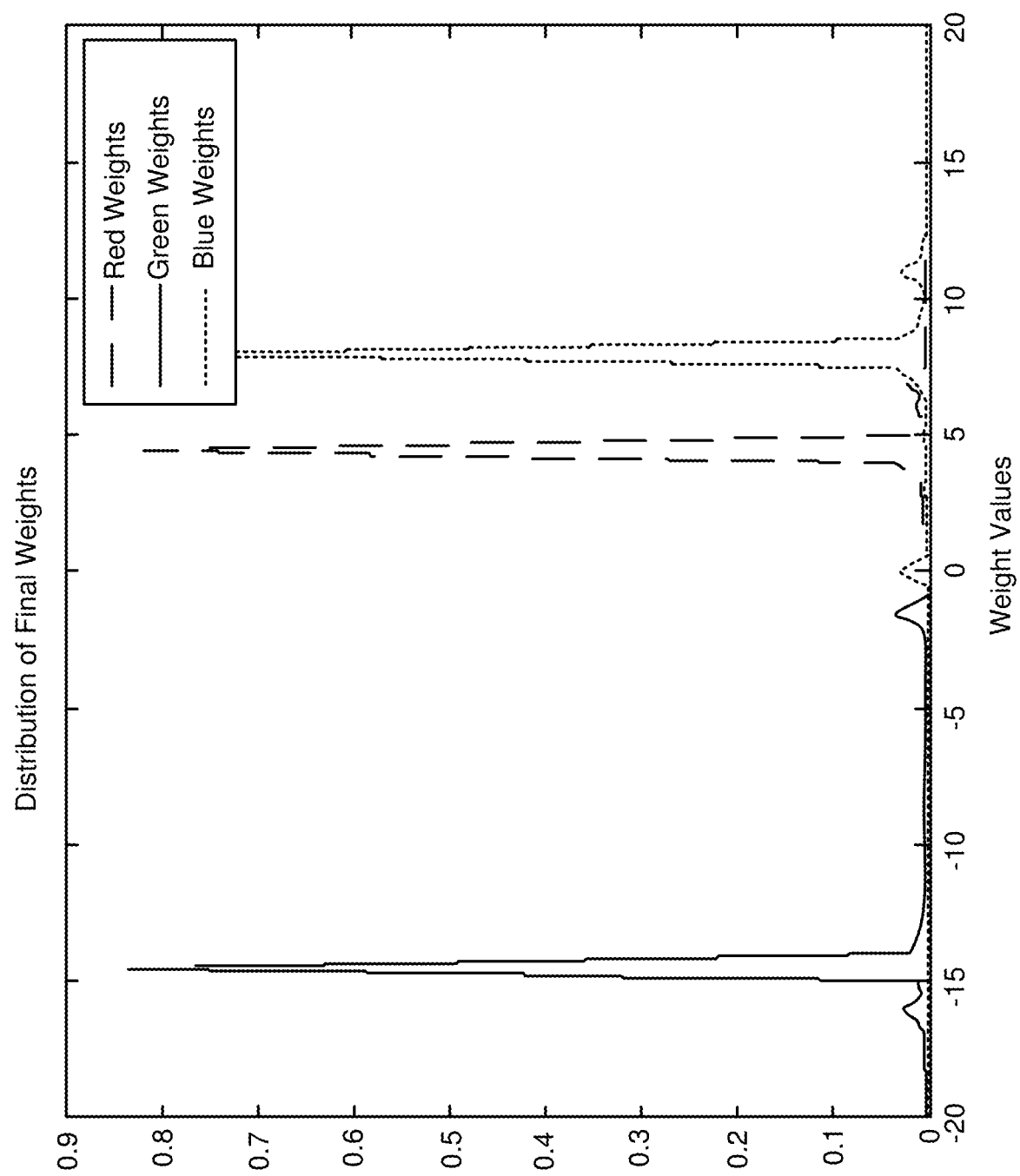
FIG. 24 shows distribution of embedding map gain values after final iteration.

FIG. 24 shows the distribution in each color channel of the final set of watermark gain values. The ideal set of gain values to achieve a visibility metric value of 10.0 is (5.3, −14.0, 8.7) for the red, green, and blue channels, respectively. The majority of gain values are very close to the ideal ones. Those that are not are a consequence of color saturation, as already discussed.

TABLE 2

Starting and ending map gain values, average visibility, and average robustness when using weighted color space squared error metric

| Trial | Start Weights | Final Weights | Final Visibility | Final Robustness |
|---|---|---|---|---|
| 1 | (1, 1, 1) | (13.4, −11.4, 13.4) | 7.4 | 12.4 |
| 2 | (5.3, −14, 8.7) | (13.5, −17, 21) | 10 | 17.6 |
| 3 | (13, −11, 13) | (13, −16, 25.4) | 10 | 18.4 |
| 4 | (14, −17, 21) | (11.6, −13.6, 33) | 10 | 19.2 |
| 5 | (5.3, −14, 8.7) | (17.6, −26, 21) | 7.5 | 23.1 |
| 6 | (18, −26, 21) | (23.4, −8.5, 33.4) | 9.1 | 29.0 |

Our next experiment involved changing the visibility metric to measure the squared error in a weighted color space. Specifically, we converted the difference image from RGB to YUV and then weighted the Y channel by 0.5 and the U and V channels by 0.25, taking into account that luminance errors (Y) are more "costly" than chrominance errors (U and V). We then ran our algorithm using different starting weights (gain values) and observed the final weights after ten iterations.

Table 2 shows the results. In trial 1 we used our default starting weights (1,1,1). The results are not ideal in this case, which is evident in the fact that the average visibility achieved is 7.4, less than the target value of 10.0. In trial 2 we set the starting weights to the ideal value when the MSE visibility model is used. In this case the results are better. The target visibility is reached and the robustness is higher than that in trial 1. Also notice that the maximum magnitude weight is now in the blue channel, which reflects the fact that blue changes are less important in a weighted color space. Starting weights for trials 3 and 4 are obtained by taking the ending weights for trials 1 and 2 and rounding. In both cases robustness continues to increase and the blue channel weight continues to increase. After two trials of ten iterations each beginning with the starting weights, we cannot say that the weights have converged but we can say that they are converging. For this reason, we feel that the algorithm needs some tuning before it is ready for the much more complicated visibility model that is referred to in section 4.

Trials 5 and 6 were run after further adapting the visibility metric to account for variation in the luminance channel that masks the watermark. The visibility metric is reduced in accordance with the standard deviation of the luminance in the neighborhood of the examined pixel. Trial 5 uses the same starting weights as Trial 2. Introducing the masking component does increase the average robustness, which is expected since more watermark signal can be added for the same level of visibility. However, notice that with this choice of starting weights the final average visibility metric has not achieved the target value of 10.0. Trial 6 was run using rounded versions of the final weights for trial 5. The result is that robustness improves substantially and average visibility moves closer to the target. We also observe the same relative lengthening of the blue channel weight that we saw in trials 3 and 4.

FIG. 25 presents pictorially the final visibility (left panel) and robustness (right panel) maps generated in Trial 6. The visibility map is fairly uniform overall. The dominant gray tone represents areas where the target visibility is achieved. Darker tones represent areas where visibility less than the target is achieved. The brighter spots are areas where overshoot occurs. Overshoot does not exceed a value of 11.5. The robustness map does not have the uniform characteristic that the visibility map has. Instead, it behaves in accordance with the characteristics of the different image regions. The sky, covered bridge, and grass all have distinct yet fairly uniform robustness. Areas of high image detail, such as the trees and edges of the bridge, have higher than average robustness. Notice that the fence area has both low visibility and low robustness. This is explained by examination of FIG. 21, which shows that the fence is near-white and hence saturated. Saturated colors cannot be embedded strongly.

7. Conclusions

We have described a method for embedding a watermark into a color image via successive refinement of the watermark gain based upon feedback from robustness and visibility metrics. Key attributes of the method are as follows:

Proceeds iteratively from a starting gain, at each step moving a short distance in the color direction that provides a good visibility/robustness tradeoff During hyperplane optimization, each pixel is operated upon independently when deciding upon the best new gain value (color direction). However, the robustness and visibility maps that inform the decisions made during hyperplane optimization may involve neighborhoods of pixels.

A perturbation analysis is used to compute differences in visibility and robustness for each color direction, independently. From this analysis we compute hyperplanes to approximate visibility and robustness changes in a small neighborhood of the current gain value.

The overall strategy involves maximizing the per pixel robustness while not exceeding the target visibility.

We tested the algorithm on the "Covered Bridge" using three progressively more complex visibility models. For the MSE-based visibility model, the final gain map converged to near-optimum weights at the target visibility in the vast majority of cases. Locations in the image where the target visibility was not achieved have saturated colors. For the visibility model based upon error in a weighted color space, the algorithm approached convergence to the target visibility. However, it required two trials to do so, where ending weights from the first trial were used as starting weights for the second trial. For the visibility model based upon the combination of masking arising from textured regions in the luminance channel with error in a weighted color space, the algorithm again approached convergence to the target visibility. Again, this required running the algorithm twice to achieve the final weights. At any rate, the resulting visibility and robustness maps were in line with our expectations. The visibility map showed a great deal of uniformity, whereas the robustness map showed greater variability in image areas of concentrated detail.

Geometric Enumerated Chrominance Watermark Embed for Spot Colors.

ABSTRACT: Most packaging is printed using spot colors to reduce cost, produce consistent colors, and achieve a wide color gamut on the package. Most watermarking techniques are designed to embed a watermark in cyan, magenta, yellow, and black for printed images or red, green, and blue for displayed digital images. Our method addresses the problem of watermarking spot color images. An image containing two or more spot colors is embedded with a watermark in two of the colors with the maximum signal strength within a user-selectable visibility constraint. The user can embed the maximum watermark signal while meeting the required visibility constraint. The method has been applied to the case of two spot colors and images have been produced that are more than twice as robust to Gaussian noise as a single color image embedded with a luminance-only watermark with the same visibility constraint.
Keywords: spot color, digital watermark.

1. Introduction

Packaging is usually printed in one of two ways:
1. Process color printing using cyan, magenta, yellow, and black (CMYK)
2. Spot color printing using special Pantone colors or other ink sets Most packaging is printed using spot colors to reduce cost, produce consistent colors, and achieve a wide color gamut on the package. Most watermarking techniques are designed to embed a watermark in cyan, magenta, yellow, and black (CMYK) for printed images or red, green, and blue (RGB) for displayed digital images.

Figure 26:
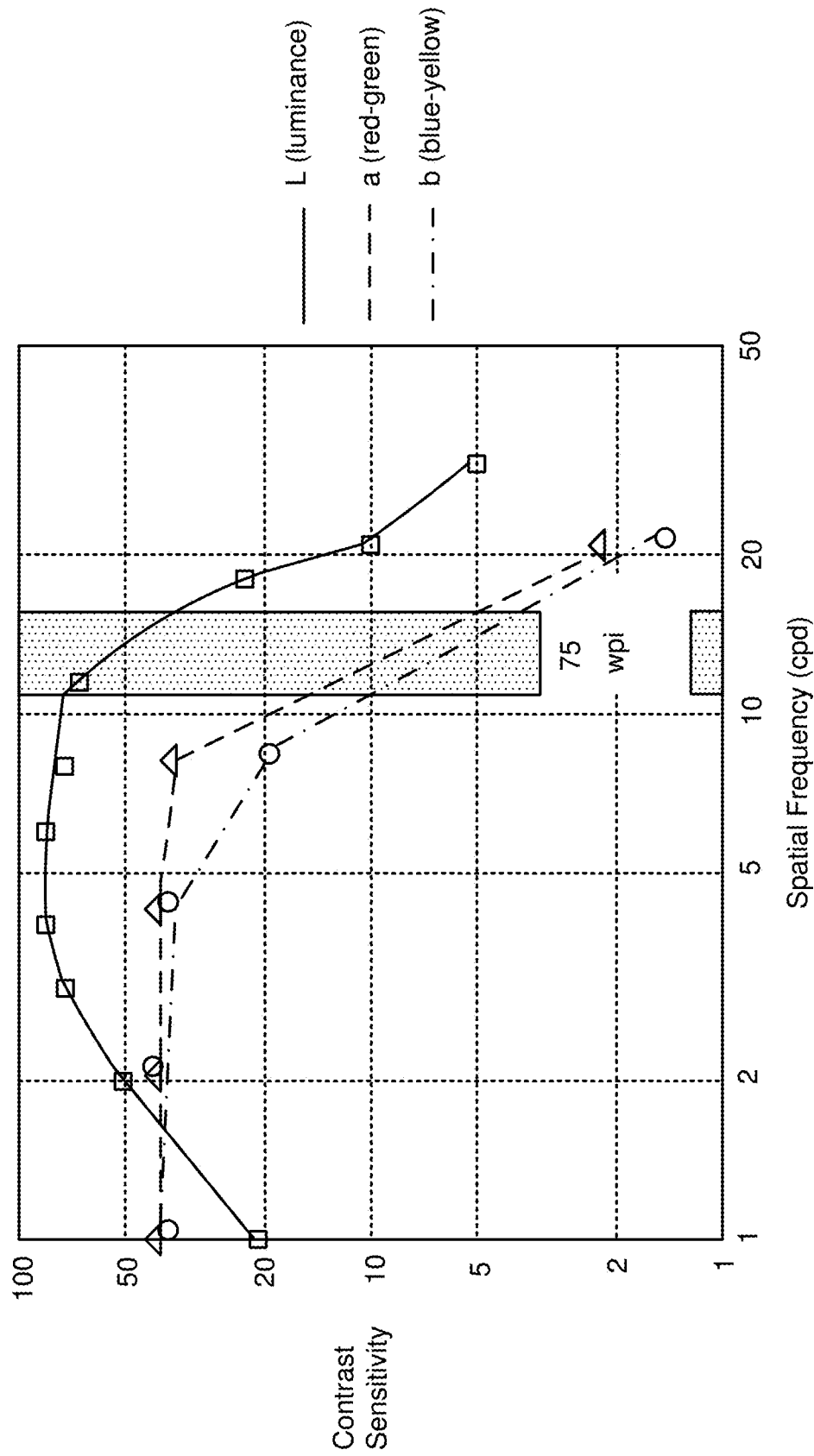
FIG. 26 is a diagram for the Human Contrast Sensitivity Function.

Our method addresses the problem of watermarking spot color images. An image containing two or more spot colors is embedded with a watermark in two of the colors with the maximum signal strength within a user-selectable visibility constraint. In the two-color case, most of the signal is embedded with low or zero luminance change to obtain the maximum signal strength within a certain visibility constraint. This is based on lower human contrast sensitivity to high frequency color changes 1 compared to luminance changes, as shown in FIG. 26.

A watermark embedded with a spatial resolution of about 75 watermark cells per inch (wpi) corresponds to degradation in the spatial frequency range shown by the gray bar above at a 12-inch viewing distance. In this spatial frequency range, the eye is about one-eighth as sensitive to changes in 'a' (red-green) as in luminance and one-sixteenth as sensitive to changes in 'b' (blue-yellow) as in luminance.

The aim is to embed the maximum watermark signal by modulating the spot color inks within a certain visibility constraint across the whole image. An approach using spot colors is essential for the packaging industry to adopt watermarking technology.

Our approach defines a color in terms of CIE Lab values. Lab is a uniform perceptual color space where a unit difference in any color direction corresponds to 1 Just Noticeable Difference (JND) for flat color patches presented to the human visual system.

The Lab axes are then scaled for the spatial frequency of the watermark being added to the image in a manner similar to the Spatial CieLab model developed by Zhang, X. and Wandell, B. A., "A spatial extension of CIELAB for digital color image reproduction", SID Proceedings, 27, 731-734 (1996). This is a uniform perceptual color space that we will call SLAB in which the Lab axes are scaled as shown here, assuming a standard 12-inch viewing distance:

L=L*4 because the luminance change at 75 wpi is ~4 times the visibility of a uniform change in L on a flat color patch.

A=a/4 because the change in 'a' at 75 wpi is ~¼ the visibility of a uniform change in 'a' on a flat color patch.

B=b/8 because the change in 'b' at 75 wpi is ~⅛ the visibility of a uniform change in 'b' on a flat color patch.

The allowable visibility magnitude in SLAB is scaled by spatial masking of the cover image. Spatial masking of the cover image is measured using the algorithm developed by Watson and is used to scale the allowable visibility across the image. This is a uniform perceptual color space that we will call VLAB, in which the visibility circle is scaled to correspond to an equal perceptual difference due to the addition of a watermark signal at that spatial frequency for that particular image.

This method builds on earlier work by Alattar, O. and Reed, A., "Watermarking spot colors", Proceedings of SPIE (2003), who watermarked spot colors with a luminance mark and Reed, A., Rogers, E. and James, D., "Chrominance watermark for mobile applications", Proceedings of SPIE (2010), who embedded a chrominance watermark into a CMYK image. Bradley, B., Reed, A. and Stach, J., "Chrominance watermark embed using a full color visibility model", Proceedings of SPIE (2012). further developed this work to use an iterative embed technique to embed the maximum watermark signal into CMYK images.

The new method described below extends this work to a single iteration embed that supports the spot color inks used in packaging and uses a full color visibility model with spatial masking. A Geometric Enumerated Chrominance Embed approach is used to evaluate a range of possible ink changes that meet the user selected visibility constraint and press constraints. The set of allowable ink changes is evaluated to choose the pair of ink changes that result in the maximum signal strength while meeting the visibility and press constraints.

2. Embed Algorithm

An image with four spot color separations (yellow, cyan, red, and blue) was used. Two colors (cyan and yellow) were varied to embed the watermark signal. Details of the model used to create a linear RGB image from these separations are given in Appendix C, Lyons, R., Reed, A. and Stach, J., "Watermark embed in optimal color direction", Proceedings of SPIE (2013).

Attached at Appendix C, and incorporated by reference herein in its entirety. A linear RGB value corresponding to 00% of the ink used for that separation is multiplied by the grayscale separation value to create a spot color separation in linear RGB. The spot color separations are combined in linear RGB to create a composite color image. A forward gamma curve is applied to this image to create a composite color image in standard RGB color space (sRGB). This composite sRGB image is then used in two ways:

1. It is converted to a grayscale image with detector weights to estimate signal strength.

2. It is converted to Lab with an International Color Consortium (ICC) color profile and then SLAB to estimate visibility.

Figure 27:
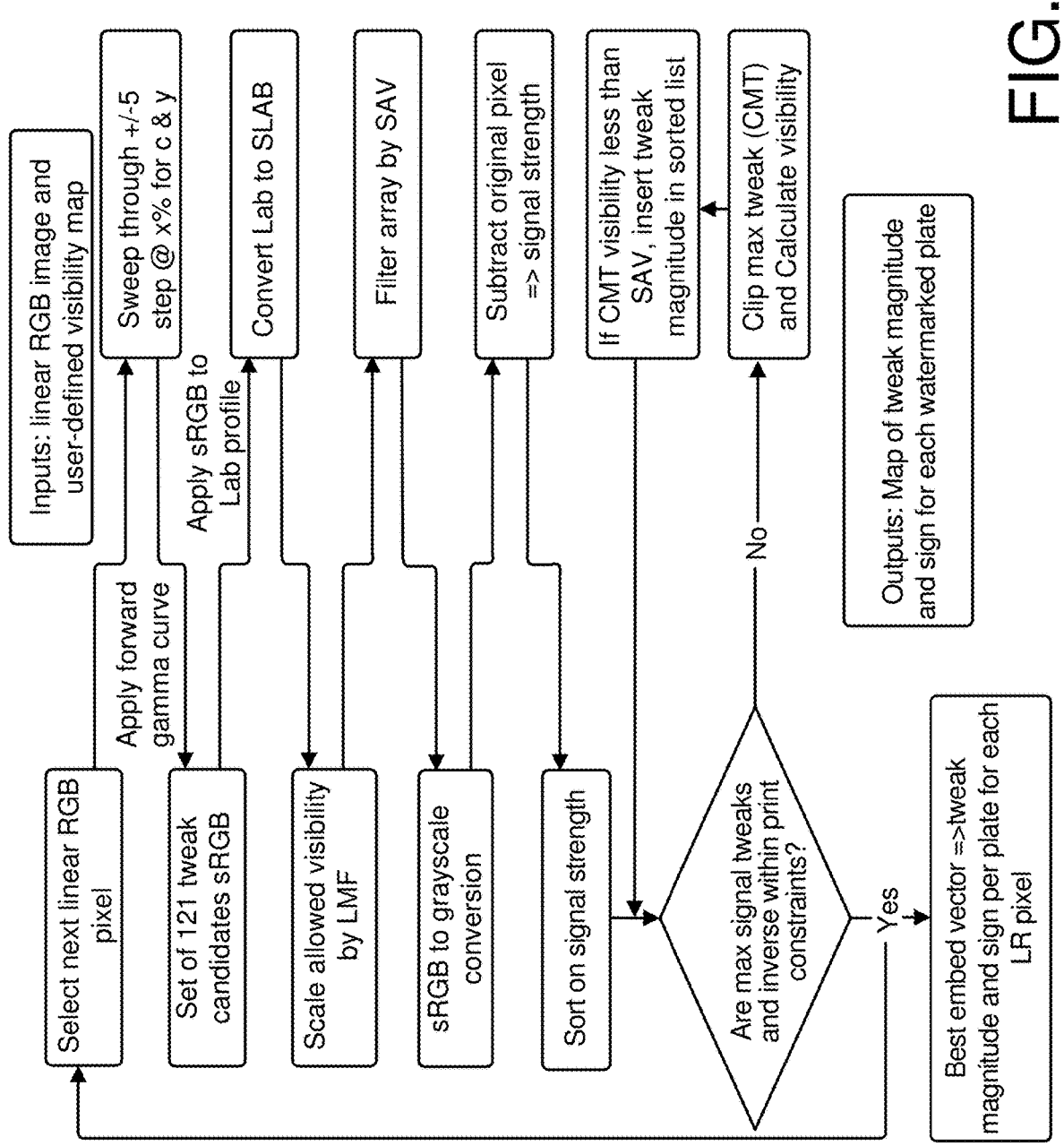
FIG. 27 is a flow diagram for a Geometric Enumerated Chrominance Embed Algorithm.

An outline of the Geometric Enumerated Chrominance Embed algorithm is shown in FIG. 27. For each pixel in the composite linear RGB image, a set of candidate tweaks are evaluated for 11 by 11 possible combinations of changes for two plates. In this example, the two plates being watermarked are cyan and yellow, and 11 by 11 possible combinations of candidate tweaks are evaluated by sweeping through +/−5 increments of a small ink percentage for each ink and calculating the 121 sRGB pixel values.

The set of 121 sRGB candidate tweaks is converted to Lab values using an ICC color profile. Lab is a standard uniform perceptual color space in which a unit change in any direction in this space corresponds to 1 JND for flat color patches presented to the human visual system. The watermark is at a higher spatial frequency so the Lab axes are scaled as shown here to be in Spatial CieLAB (SLAB), assuming a standard 12-inch viewing distance:

L=L*4 because the luminance change at 75 wpi is ~4 times the visibility of a uniform change in L on a flat color patch.

A=a/4 because the change in 'a' at 75 wpi is ~¼ the visibility of a uniform change in 'a' on a flat color patch.

B=b/8 because the change in 'b' at 75 wpi is ~⅛ the visibility of a uniform change in 'b' on a flat color patch.

Figure 28:
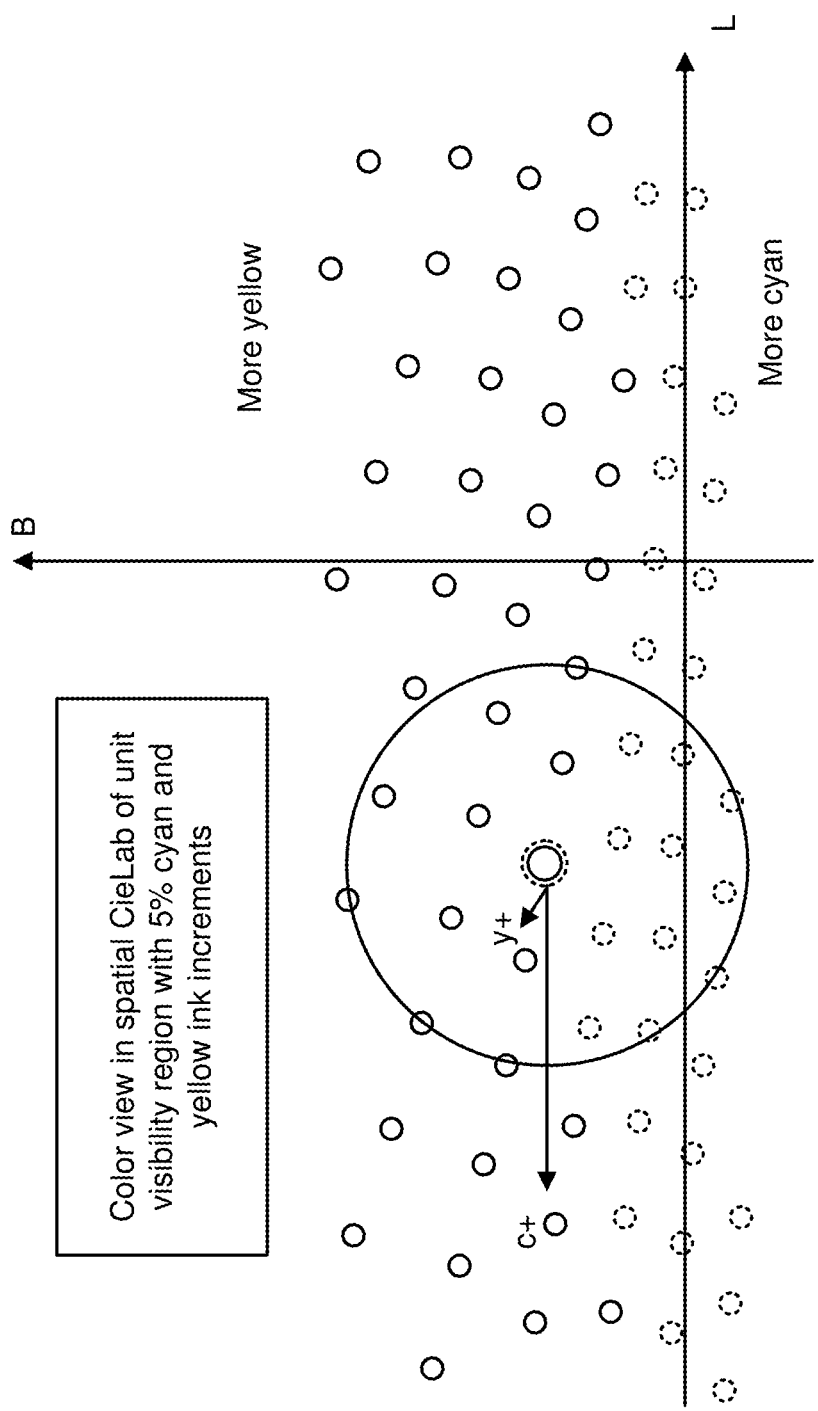
FIG. 28 is a plot of equal cyan and yellow ink increments plotted in SLAB (a two-dimensional LB slice in SLAB).

The Lab values are converted to SLAB because the watermark is applied in the spatial frequency range corresponding to 75 wpi. A Euclidean distance in SLAB is used to measure the perceptual error per pixel of a flat patch with that local color and noise added at 75 wpi, as shown in FIG. 28 (a two-dimensional LB slice in SLAB). The allowable visibility error per pixel is denoted by a black circle in this slice (the small blue circle shows the original pixel color). The radius of this circle is scaled by the Luminance Masking Function (LMF) and is called the Scaled Allowable Visibility (SAV). All the tweak combinations within this circle have visibility differences that are within the SAV and are therefore candidate tweaks to be assessed for signal strength.

The allowable tweaks are further limited by press constraints to avoid going outside the minimum and maximum percent dot press limits. Clipping of the watermark due to press constraints would cause a shift in the average plate color, because the positive and negative tweaks would no longer be of equal magnitude. This results in a dc color shift that would be very visible.

Signal strength is calculated by converting the candidate tweaks with allowed visibility to gray using detector color weights that are aligned with the embed color direction. Each candidate tweak is subtracted from the original pixel value, and the magnitude of this is an estimate of signal value. The candidate tweaks are sorted on signal strength magnitude.

The candidate tweak with the largest signal magnitude is evaluated to see if the tweak and its inverse are both within the print constraints. If so, then the tweak magnitude and sign is stored for each color separation being varied. If not, then the maximum tweak magnitude is clipped so that it stays within press constraints, and the candidate tweak visibility is recalculated. If the visibility of this clipped maximum tweak (CMT) is less than the SAV then the signal strength magnitude is calculated and inserted in the sorted list for this pixel. This process is repeated until a candidate tweak with the maximum signal magnitude that stays within press constraints is selected for this pixel.

The output of this process is a map file for the cyan and yellow plates that specifies the magnitude and sign for the tweak to be applied for these separations at each pixel in the image.

3. Experimental Results

Figure 29:
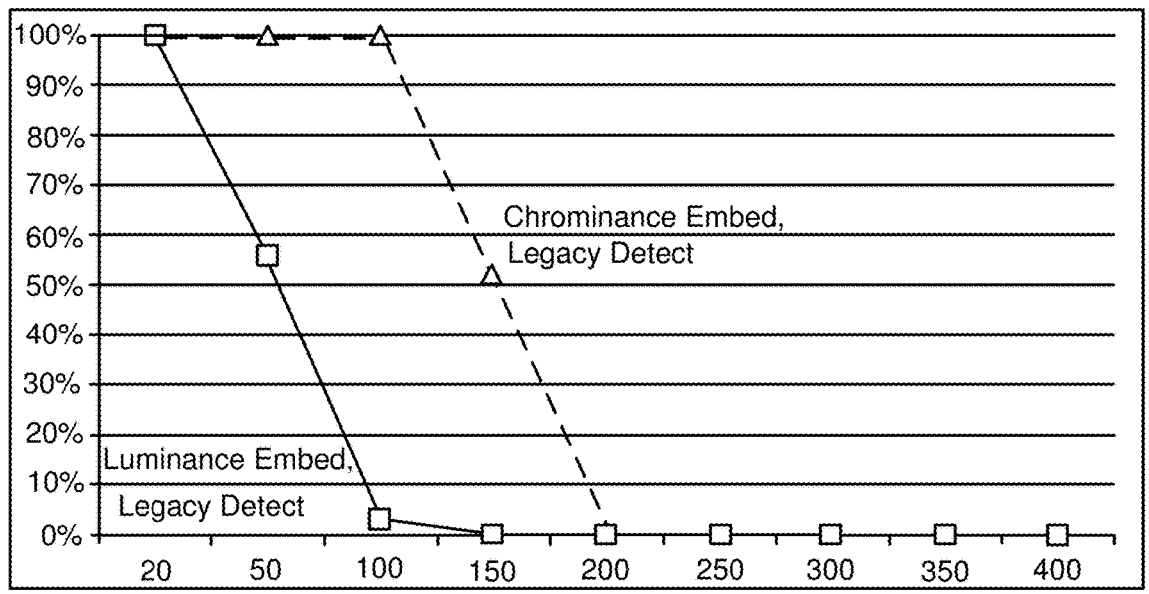
FIG. 29 shows Gaussian noise robustness of luminance embed versus chrominance embed at medium visibility using a legacy detector.
Figure 30:
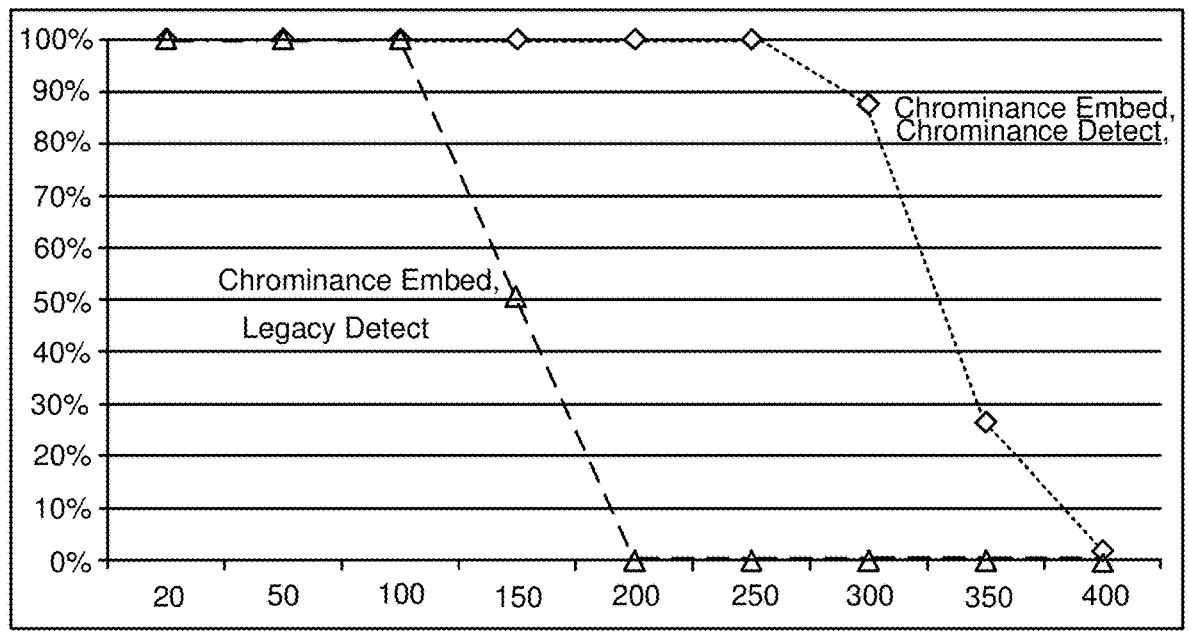
FIG. 30 shows Gaussian noise robustness of chrominance embed at medium visibility using a luminance versus chrominance detector.

Robustness comparisons of a test image embedded using the above Geometric Enumerated Chrominance Embed algorithm with a Luminance Embed at the same visibility using a legacy watermark detector are shown below in FIG. 29. The improvement in watermark robustness, when the color direction with the optimum signal to noise ratio is selected, is shown by the le marked 'Chrominance Detect' in FIG. 30.

The spot color separations in the chrominance-embed image were cyan, yellow, red, and blue; the cyan and yellow plates were watermarked. The luminance-embed image was created in green, red, and blue spot color separations to be similar visually; only the green plate was watermarked.

Robustness margin was measured by scanning the printed image at 300 dpi and then adding Gaussian noise to the scan until the watermark failed to read. Reading to a higher Gaussian noise level indicates a higher watermark signal was embedded at the same visibility.

4. Conclusions and Future Work

A method has been described that allows an image containing two or more spot colors to be embedded with a watermark in two of the spot colors with the maximum signal strength within a user selectable visibility constraint. The method has been applied to an image with four spot colors and a watermark was embedded in two of the colors. The same image was created with three spot colors where a single color plate was embedded with a luminance-only watermark with the same visibility constraint. The chrominance watermarked image was more than twice as robust to Gaussian noise as the luminance marked image using legacy detector weights.

This approach can be extended to support embedding three or more spot colors. The look-up table based approach that is being used is fast and can easily be extended to three or more dimensions while remaining computationally reasonable.

Watermark Embedding in Optimal Color Direction.

ABSTRACT: To watermark spot color packaging images one modulates available spot color inks to create a watermark signal. By perturbing different combinations of inks one can change the color direction of the watermark signal. In this paper we describe how to calculate the optimal color direction that embeds the maximum signal while keeping the visibility below some specified acceptable value. The optimal color direction depends on the starting color for the image region, the ink density constraints and the definition of the watermark signal. After a description of the general problem of N spot color inks we shall describe two-ink embedding methods and try to find the optimal direction that will maximize robustness at a given visibility. The optimal color direction is usually in a chrominance direction and the resulting ink perturbations change the luminosity very little. We compare the optimal color embedder to a single-color embedder. Keywords: watermark, embedding. Optimal color direction, chrominance embed.

1. Introduction

Digimarc Discover uses a smart phone to read watermarks embedded in print materials. Expanding Discover to include packaging material used a new approach to the embedding process. Magazines are typically printed using the CMYK inks whereas packaging is often printed with special Pantone colored inks referred to as spot colors. Most watermarking techniques are designed to embed in either RGB or CMYK. A spot color cannot be broken down into constituent CMYK components so a new technique is used to embed a watermark into these spot color images. In this paper we propose a new technique that will work on images printed with arbitrary spot colors.

Early watermarking systems inserted a watermark along the gray ((R+G+B)/3) direction in RGB images (see Cox, I., Miller, M. and Bloom, J., [Digital Watermarking], Morgan Kaufmann Publishers, SF, CA (2002)) or the luminance direction in CMYK images. There were early experiments in spot color embedding for luminance based detectors (see Alattar, O., Reed, A., "Watermarking Spot Colors", Proceedings of SPIE (2003)). But changes in either the gray or the luminance channel are easily discerned by the human visual system so the chrominance watermark was developed. A chrominance watermark (see Reed, A., Rogers, E., James, D., "Chrominance Watermark for Mobile Applications", Proceedings of SPIE (2010)) embeds a signal along a chrominance direction. This is less visible than a luminance watermark and provides excellent robustness for a fixed visibility target. However, these chrominance watermarking techniques rarely work with spot colors. This paper addresses this problem by finding the optimal watermark for spot colors, which is usually in a chrominance direction.

We attempt to find the optimal color direction to embed a signal that has the best signal strength per unit of visibility change. In section 3 we describe a generic embedding algorithm that should work for any number of spot colors. In section 4 we derive approximate formulas that assist in the two-color versions of the enumerated embedder described in section 3. In section 5 we discuss detection results for the embedded images.

The methods described in this paper should apply to most watermarking systems and there are few algorithmic assumptions. However we do rely on the following assumption: Before the detection algorithm begins the color image is converted to a monochrome image using some function of the color coordinates. For example, the detector may convert the RGB image to monochrome using the gray conversion which sets the monochrome pixels to (R+G+B)/3. We will discuss different ways the detector might convert the RGB to monochrome, but we will assume that the detector performs this monochrome conversion before the detection algorithms begin. In this paper we will only consider detectors which have a fixed color direction used to extract the monochrome watermark signal. This requirement is not absolutely essential but there are additional complexities if the signal direction is image dependent.

2. Color Embedding

A printer deposits inks on a page to produce a color image. Typical commercial printers have high native resolutions and use halftoning or some other technique to achieve specific colors. The essence of halftoning is that the human eye cannot see the high resolution features but only sees the average color density over a larger area. Thus we have two important resolutions: the printer resolution and the HVS resolution. To model changes in the image on the HVS we must compute the colors at the HVS resolution. To accommodate this we view the printed page as a rectangular array of HVS pixels. The printer deposits N inks of colors $C_1$, $C_2$, ... $C_N$ onto the printed page. Printing results in a collection of ink fractional areas $i_1, i_2 \ldots i_N$ that determine the percentage of printed color for that pixel. For example, if $C_1$ is red then the values (1.0, 0, ..., 0) mean that 100% of the pixel is covered with red ink and this corresponds to the color red. The color (0.5, 0, ... 0) is the color created with 50% of the pixel is coved with the red ink. Because the values $i_1, i_2 \ldots i_N$ correspond to fractional ink area coverage, they satisfy, $$0 \leq i_1, i_1, \ldots i_N \leq 1.0$$

We call the values $i_k$ the linear ink coordinates and we denote the linear ink coordinates of a pixel by $(i_1, i_2 \ldots, i_N)$.

If we wish to insert a watermark into a cover image $I_{Cov}$ then we must change the pixels in some prescribed way. If a pixel has linear ink coordinates $I=(i_1, i_2 \ldots, I_N)$ then we insert the watermark signal by perturbing these ink fractional area coordinates. The new watermarked pixel might have coordinates $(i_1+\Delta_1, i_2+\Delta_2 \ldots, i_N+\Delta_N)$. The values $\Delta_k$ are referred to as tweaks. Watermarks often have a signal resolution that is fixed to minimize errors in the print and camera channels. This means there are three important resolutions: image artwork resolution, the watermark signal resolution and the resolution of the HVS. The interaction of these three resolutions is quite important to a working watermark system but we will not consider these resolution problems in detail.

Computing the resultant color from a collection of linear ink coordinates and the substrate color is a complex problem and we use the simplest subtractive mixing model. To combine the inks to form an RGB image we first let color $C_k$ have RGB fractional coordinates $R_k, G_k, B_k$ that are numbers between 0 and 1.0. We use the RGB values that are the closest representative of the color in the RGB gamut. To compute the linear RGB coordinates of the printed document with white substrate we set, $$R_{tot}=(1-(1-R_1)i_1)(1-(1-R_2)i_2) \ldots (1-(1-R_N)i_N)$$

$$G_{tot}=(1-(1-G_1)i_1)(1-(1-G_2)i_2) \ldots (1-(1-G_N)i_N)$$

$$B_{tot}=(1-(1-B_1)i_1)(1-(1-B_2)i_2) \ldots (1-(1-B_N)i_N)$$

These values for RGB are linear RGB values. When the image is printed and captured the result will be an sRGB image and we will compute the signal strength using these sRGB coordinates. To model the watermark signal we must convert the linear RGB values to sRGB.

Figure 31:
FIG. 31 is a block diagram for converting linear inks into sRGB.

The result is a mapping, shown in FIG. 31, that takes linear ink coordinates to sRGB values (the WM Signal is calculated in sRGB), $$(i_1,i_2, \ldots ,i_N) \rightarrow (R(i_1, \ldots ,i_N), G(i_1, \ldots ,i_N), B(i_1, \ldots ,i_N)) \quad (20)$$

Detectors usually convert sRGB triplet values to a single number which we call the raw watermark signal. For example, a grayscale detector has a raw watermark signal given by, $$S:(i_1,i_2, \ldots ,i_N) \rightarrow \tfrac{1}{3}(R(i_1, \ldots ,i_N)+G(i_1, \ldots ,i_N)+B(i_1, \ldots ,i_N))$$

If our cover image has linear ink coordinates $(i_1, i_2 \ldots i_n)$ and we add $\Delta 1$ and $\Delta 3$ to inks 1 and 3 respectively then the signal inserted is given by, $$\Delta S = S(i_1+\Delta_1,i_2,i_3+\Delta_3,i_4, \ldots ,i_N) - S(i_1,i_2,i_3,i_4, \ldots ,i_N) \quad (21)$$

When we watermark an image we start with a cover image $I_{Cov}$ and alter the pixels to produce a watermarked image $I_{WM}$. To measure the visibility of the watermarked image we use a modification of CIELAB coordinates. CIELAB (CIE 1976) coordinates were developed from Richard Hunter's attempt to measure colors differences that were "just perceptible" to the human visual system. The CIELAB coordinate have three color coordinates L-a-b that have the property that equal coordinate differences correspond to equal perceptibility differences. However, Hunter's tests were conducted with flat colors, and a watermark signal contains significant energy at higher frequencies. Wandell has recently repeated these experiments with fine color patterns (see Zhang, X. and Wandell, B., "A Spatial Extension of CIELAB for Digital Color Image Reproduction", SID Proceedings 27, 731-734 (1996)). Wandell's results show that the sensitivity of the human visual system to the a and b channels deteriorates rapidly when the line spacing is above 10 cycles per degree. Using these results Reed et al. (see Bradley, B., Reed, A., Stach, J., "Chrominance Watermark Embed Using a Full Color Visibility Model", Proceedings of SPIE (2012)) proposed embedding along a chrominance direction. Using these results we modify the traditional CIELAB coordinates by scaling a and b appropriately to get a new coordinate system that we call SLAB (Spatial Lab). In this coordinate system equal coordinate changes correspond to equal visibility changes for the watermark signal. We use these coordinates to measure the effective visibility change introduced by the watermark signal.

Figure 32:
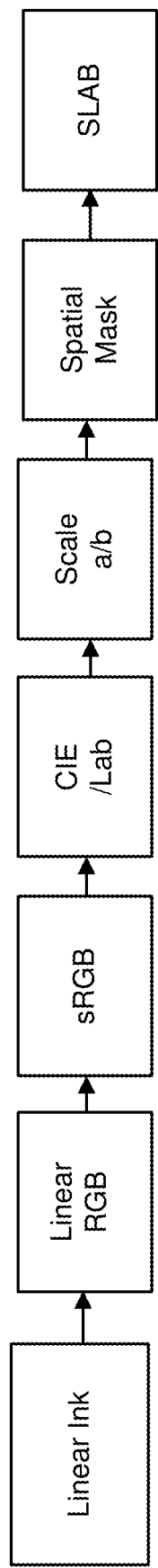
FIG. 32 is a block diagram for computing the visibility coordinates (SLAB) of a perturbed image.

In addition to this frequency based attenuation the human visual system is less sensitive to changes if the cover image is rapidly changing. This spatial masking is a final scaling factor added to the SLAB coordinates. We draw the visibility calculation in FIG. 32. For more details see the companion article (Reed, A., Lyons, R., Stach, J., "Geometric Enumerated Chrominance Watermark for Spot Colors", Proceedings of SPIE (2013), Appendix B). The SLAB coordinates are denoted by L, A, and B.

Using this conversion process we get a map from linear ink coordinates to SLAB coordinates, which we denote by the vector valued function X.

$$(i_1, \ldots, i_N) \to X(i_1, \ldots, i_N) = (L(i_1, \ldots, i_N), A(i_1, \ldots, i_N), B(i_1, \ldots, i_N)) \quad (22)$$

Once the linear ink coordinates are mapped to SLAB then the visibility differences correspond to Euclidean distance. If our cover image has linear ink coordinates $(i_1, i_2 \ldots i_N)$ and we add $\Delta 1$ and $\Delta 3$ to inks 1 and 3 respectively then the change in visibility is given by, $$(i_1, \ldots, i_N) \to \sqrt{\frac{(L(I+\Delta)-L(I))^2 + (A(I+\Delta)-A(I))^2 +}{(B(I+\Delta)-B(I))^2}} \quad (23)$$

where $I=(i_1, \ldots, i_N), I+\Delta=(i_1+\Delta 1, i_2, i_3+\Delta_3, \ldots, i_N)$
We use the notation $I=(i_1, i_2 \ldots i_N)$ as a shorthand.

Given a fixed visibility target $V_T$, the optimal watermark is a collection of linear ink values $i_1, i_2 \ldots i_N$, that maximize the signal strength while satisfying the visibility constraint. This means that we need to find ink changes $\Delta 1, \Delta 2 \ldots \Delta N$ that maximize $S(I+\Delta)$, $$\max_{\Delta} S(I+\Delta), \text{ where } I=(i_1, \ldots, i_N), \Delta=(\Delta_1, \ldots, \Delta_N) \quad (24)$$

with $$(L(I+\Delta)-(L(I))^2 + (A(I+\Delta)-A(I))^2 + (B(I+\Delta)-(B(I))^2 \le V_T^2 \quad (25)$$

This optimization problem is solvable since the visibility is measured on pixel consistent with the human visual system and so is measured locally.

The value of $\Delta=(\Delta_1, \Delta_2 \ldots \Delta N)$ that maximizes $S(I+\Delta)$ but keeps the visibility within the visibility constraint $V_T$ is the suggested tweak for the pixel. However, this signal is always positive. We wish to be able to insert a negative tweak as well. The optimal negative tweak is given by, $$\max_{\Delta} (-S(I+\Delta)), \text{ where } I=(i_1, \ldots, i_N), \Delta=(\Delta_1, \ldots, \Delta_N)$$

with $$(L(I+\Delta)-(L(I))^2 + (A(I+\Delta)-A(I))^2 + (B(I+\Delta)-(B(I))^2 \le V_T^2$$

There is a subtle difficulty here. If $\Delta_+$ is the best positive tweak and $\Delta_-$ is the best negative tweak then we must insist that,
1) $\Delta_+ = -\Delta_-$
2) The number of WM positive tweaks the number of WM negative tweaks.

If the watermark needs a positive tweak applied then the pixel is changed by some scale (less that 1.0) of $A_+$ and if a negative tweak is called for then the pixel's ink is altered in the direction of $\Delta_-$. The first condition above states that the negative tweak must be the negative of the positive tweak. If the two tweaks are not negatives then successive positive and negative tweaks might add an overall DC component to the color. This modification of the image color is unacceptable and will be noticeable. Recall that the perturbations are not noticeable at the watermark insertion frequencies but are more apparent at lower spatial frequencies.

We now proceed to discuss two different implementations of our color embedder. The first enumerated embedder is a brute force trial of all possible linear ink values. The second geometric implementation uses a linear approximation for the visibility model to predict the allowable linear ink coordinates.

3. Enumerated Embed

Let $I_{Cov}$ be a cover image of dimensions $W_x H$. For every pixel in $I_{Cov}$ we need to find a pair of ink tweaks, $\Delta_+$ and $\Delta_-$ so that the watermark can be inserted. As we mentioned above, some care is taken to ensure that the region we pick for our color analysis is large enough so that the HVS analysis is correct. The human eye cannot see these high resolutions very well (see Bradley, B., Reed, A., Stach, J., "Chrominance Watermark Embed Using a Full Color Visibility Model", Proceedings of SPIE (2012)). We will ignore these difficulties and assume that the image resolution is sufficiently coarse.

For a fixed pixel $P_0$ with linear ink coordinates $I=(i_1, i_2 \ldots i_n)$. We want to test all ink combinations in a neighborhood of our starting point I. We choose the neighborhood large enough to insure that all ink tweaks that satisfy the visibility constraint are included. The neighborhood of ink test points can be quite coarse depending on the desired accuracy of the visibility. For example if $i1=0.5$ then we may take the samples $t_1=k/50$, for $k=0, \ldots, 50$. The value of 50 is somewhat arbitrary. With 50 samples we can only change linear ink coordinates by $1/50$. If we choose 50 for every ink we end up with a total of $N^{50}$ possible ink combinations.

From this collection of sample ink tweaks we eliminate the samples that do not satisfy our visibility constraint. To see if a point meets the visibility constraint, we convert from linear ink to SLAB coordinates as described in FIG. 32 and then use equation 25 to see if the ink tweaks satisfy the visibility constraint. If the point does not satisfy the visibility constraint then we eliminate it from consideration.

We end up with a collection of points, expressed in linear ink coordinates, which represent the tweaks that meet the visibility constraint. From this set of points we need to pick the tweak with the strongest signal, but both the positive and negative tweaks must be in our collection of visibly acceptable points. To find the optimal tweaks:

1. Sort the collection of points that meet the visibility requirement according to the signal strength. The signal strength is usually measured in sRGB so the points must be processed according to FIG. 31. Once the points are expressed in sRGB coordinates we can use equation 21 to find the signal strength.

2. Take the next point $P1=(i_1+\Delta_1, i_2+\Delta_2, \ldots, i_N+\Delta_N)$ in the sorted collection. This is the point with the next highest signal. If the point $(i_1-\Delta_1, i2-\Delta_2, \ldots, i_N-\Delta_N)$ is in the collection, then we have our optimal color direction and we can stop.

3. If the negative tweak is not in the collection then to avoid a DC color shift the point cannot be used. In this case we go to the next element in the list and proceed back to step 2.

When we are finished we have a pair of optimal tweaks $\Delta+$ and $\Delta-$, for every pixel in the image. The watermark embedder can now proceed and calculate the necessary positive and negative tweaks. The watermark can be in the frequency domain or spatial domain, and it can have a geometric distortion template or not. These issues are left up to the watermark designer. The algorithm we describe derives the color direction and ink tweak magnitudes that the watermark embedder can use to insert its signal that should be independent of the detector specifics.

To illustrate the process we fix a given pixel and vary only two linear ink coordinates. The result is the surface in FIG. 33. We change ink coordinates 1 and 2. The resulting color is reflected in the curved surface. The height of the curved surface is the change in visibility. The visibility target (=1.0) is the gray plane. The elliptical shaped gray pool is the collection of linear ink values that satisfy the visibility constraint. We plot the value of the gray signal (=(R+G+B)/3) on the gray plane. The two optimal embed points are shown as black marks. (In FIG. 33, the vertical black line indicates the cover image starting color. Curved plane shows visibility of new ink pairs. The color on this plane is the expected color of the linear ink coordinates. The flat gray plane is the visibility target (=1.0) with the gray signal on the plane (=(R+G+B)/3). Blue lines and red outline indicate the linear approximation results.)

Figure 34:
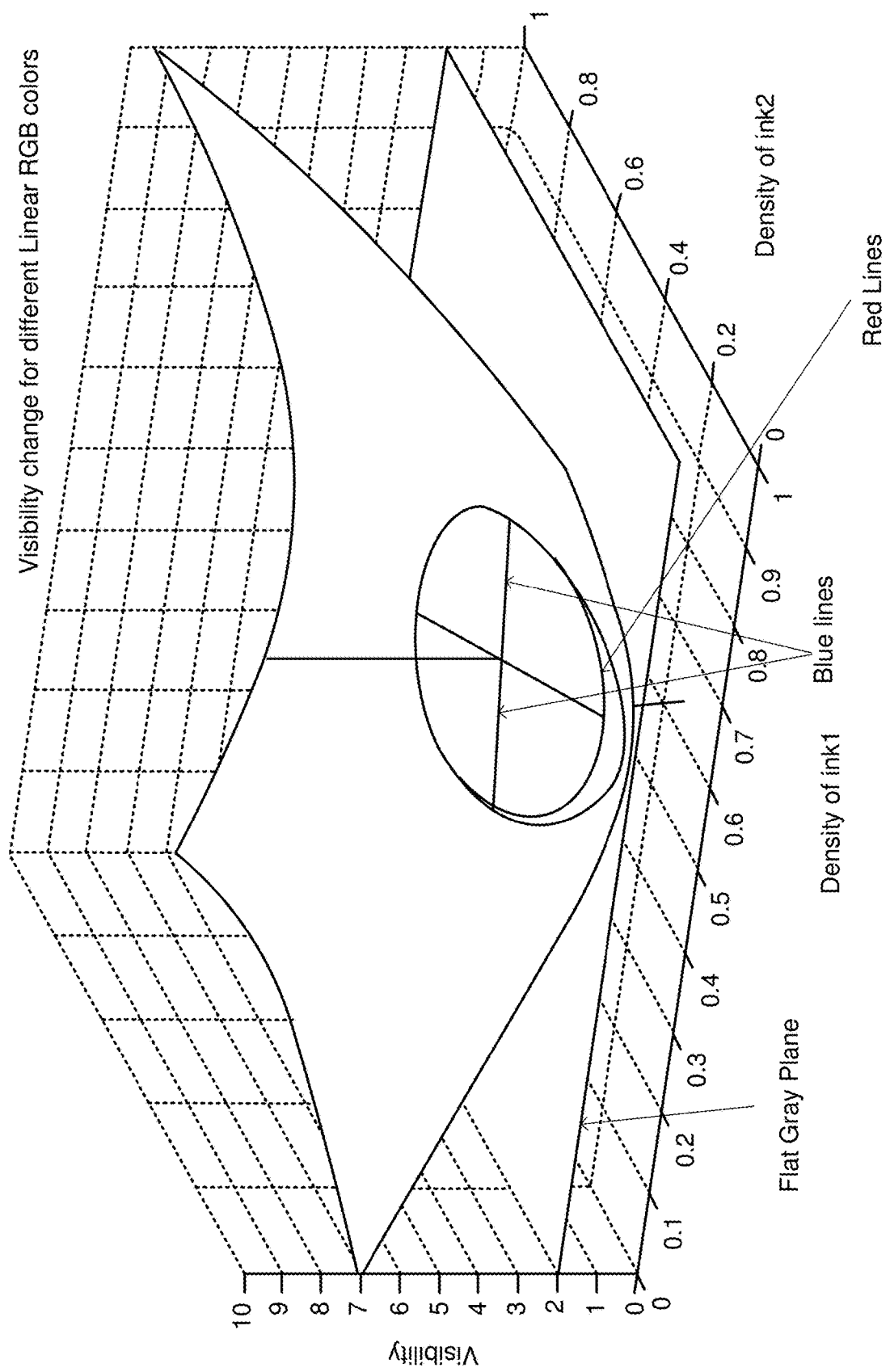
FIG. 34 is another plot showing visibility as a function of two linear ink coordinates.

In FIG. 34 we have a similar plot. In this case the visibility target was raised to 2.0 so the gray plane is raised. In this plot we used the chrominance channel U, from the YUV color space, for the watermark signal strength. The channel U is a linear combination of sRGB coordinates, U=−0.15 R−0.29 G+0.44 B. Notice that the orientation of the signal strength relative to the visibility ellipse allows one to insert quite a bit more signal. As above, the blue and red lines indicate the ellipse derived from the linear approximation in section 4. (In FIG. 34, the visibility target is set to 2.0. We also changed the underlying signal to corresponds to the "U" color channel so the signal is S=(−0.15 R−0.29 G+0.44 B).)

To streamline the embed process it is often useful to limit the search to a subset of the possible inks. This reduces the complexity of the search. If there are more than three inks then there will be redundancies (many ink combinations result in the same color). In this case there is likely very little lost by restricting the search to a subset of the ink colors.

In any case, we are not restricting the colors of the searched inks and any spot color is an acceptable search candidate.

The enumerated color space embedder is an accurate but computationally expensive method for determining the optimal color direction. This method might be acceptable in applications where the embedding is not expected to occur in real time. However, it would be good to have an alternative approach that is not so computationally expensive. If section 4 we present an attempt to reduce the computational complexity.

4. Two Color Geometric Embed

If we vary only two or three of the N ink colors then we can estimate the points that are within the visibility limit using a linear approximation. In this section we shall show how to derive the equation of the elliptical region of visibly allowable linear ink values for the case when we vary only two inks. As discussed in section 3, this is not a severe restriction.

We start with a cover image $I_{Cov}$ of dimensions W×H. Fix a pixel $P_0$ which has linear ink coordinates I=(i1, i2 ... iN). We want to find the optimal color direction if we only change ink 1 and ink 2. We start with the function X which takes the linear ink values at I and compute the SLAB coordinates X(I)=(L(I), A(I), B(I)). The best local affine approximation to this function is determined by the Jacobean of the function (for a general discussion of the geometric aspects in this section see McCleary2). The affine approximation for the function X(I+Δ) is given by, $$\begin{bmatrix} L(I+\Delta) \\ A(I+\Delta) \\ B(I+\Delta) \end{bmatrix} = \begin{bmatrix} L(I) \\ A(I) \\ B(I) \end{bmatrix} + \begin{bmatrix} \frac{\partial L}{\partial i_1}(I) & \frac{\partial L}{\partial i_2}(I) \\ \frac{\partial A}{\partial i_1}(I) & \frac{\partial A}{\partial i_2}(I) \\ \frac{\partial B}{\partial i_1}(I) & \frac{\partial B}{\partial i_2}(I) \end{bmatrix} \begin{bmatrix} \Delta_1 \\ \Delta_2 \end{bmatrix} \quad (26)$$

This affine mapping maps the two dimensional ink plane $(i_1, i_2)$ to the tangent plane at the point X(I). The tangent plane is spanned by the two vectors appearing in the Jacobean, which are the derivatives of X with respect to $i_1$ and $i_2$.

$$D_{i_1}X(I) = \begin{bmatrix} \frac{\partial L}{\partial i_1}(I) \\ \frac{\partial A}{\partial i_1}(I) \\ \frac{\partial B}{\partial i_1}(I) \end{bmatrix} \text{ and } D_{i_2}X(I) = \begin{bmatrix} \frac{\partial L}{\partial i_2}(I) \\ \frac{\partial A}{\partial i_2}(I) \\ \frac{\partial B}{\partial i_2}(I) \end{bmatrix}$$

From these two vectors we form the three quantities which determine our ellipse with center at (Δ1,Δ2)=(0,0).

$$E=(D_{i_1}X(I)\cdot D_{i_1}X(I)), F=(D_{i_1}X(I)\cdot D_{i_2}X(I)), G=(D_{i_2}X(I)\cdot D_{i_2}X(I)) \quad (27)$$

If we use the affine approximation in equation 26 to estimate the points that are within acceptable visibility and use equation 25 we get the condition, $$\|\Delta_1 D_{i_1}X(I)+\Delta_2 D_{i_2}X(I)\|^2 = \Delta_1^2 E + 2\Delta_1\Delta_2 F + \Delta_2^2 G \leq V_T^2 \quad (28)$$

This is the equation of an ellipse. To find the axes of the ellipse we use matrix notation, $$[\Delta_1 \; \Delta_2]\begin{bmatrix} E & F \\ F & G \end{bmatrix}\begin{bmatrix} \Delta_1 \\ \Delta_2 \end{bmatrix} \leq V_T^2. \quad (29)$$

The major and minor axes are the eigenvectors of this symmetric matrix. In Differential Geometry this is the called The First Fundamental Form for the visibility surface (see McCleary, J. [Geometry from a Differentiable Viewpoint], Cambridge University Press, Cambridge, UK (1994)).

The two eigen values of the matrix are given by, $$\lambda_+, \lambda_- = \frac{1}{2}\left((E+G) \pm \sqrt{(E-G)^2 + 4F^2}\right)$$

The two eigenvectors are given by, $$\begin{bmatrix} \lambda_- - G \\ F \end{bmatrix} \text{ and } \begin{bmatrix} F \\ \lambda_+ - E \end{bmatrix}.$$

The first is the major axis and the second is the minor axis. The lengths of the axes are given by, $$V_T\sqrt{\lambda_-} \text{ and } V_T\sqrt{\lambda_+}.$$

Figure 33:
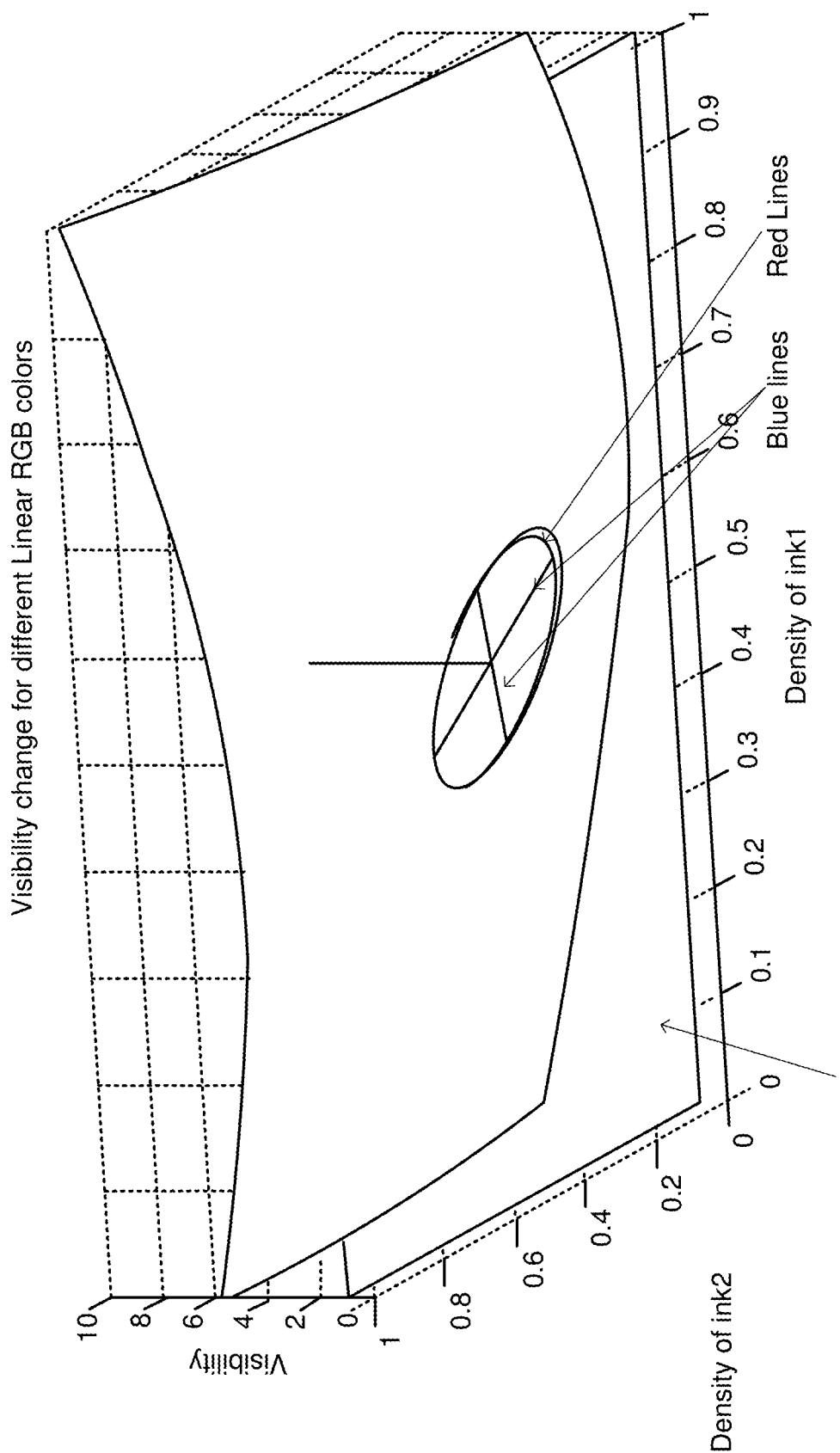
FIG. 33 is a plot showing visibility as a function of two linear ink coordinates.
Figure 35:
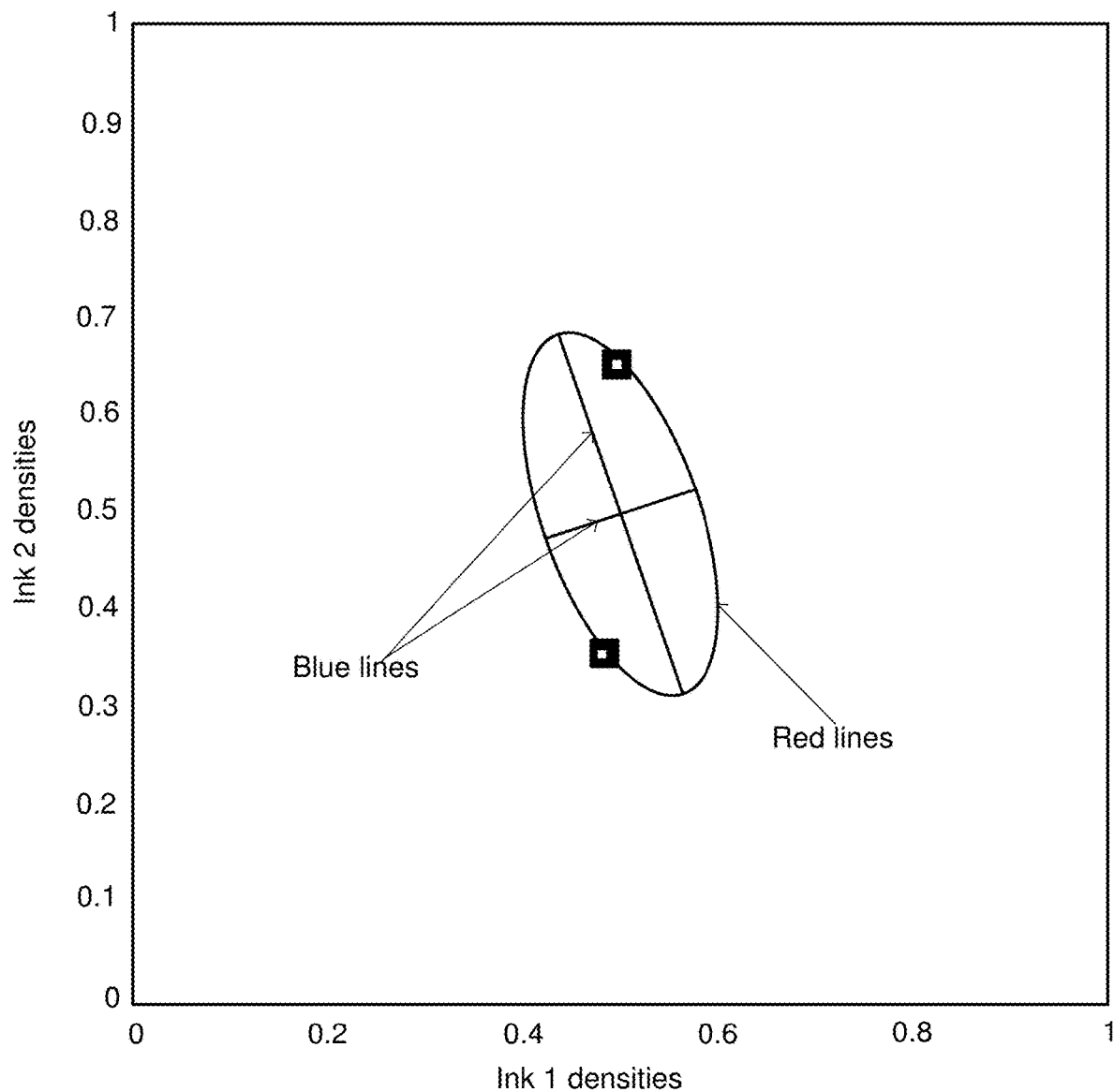
FIG. 35 shows a top view of elliptical region of acceptable visibility shows FIG. 33.
Figure 36:
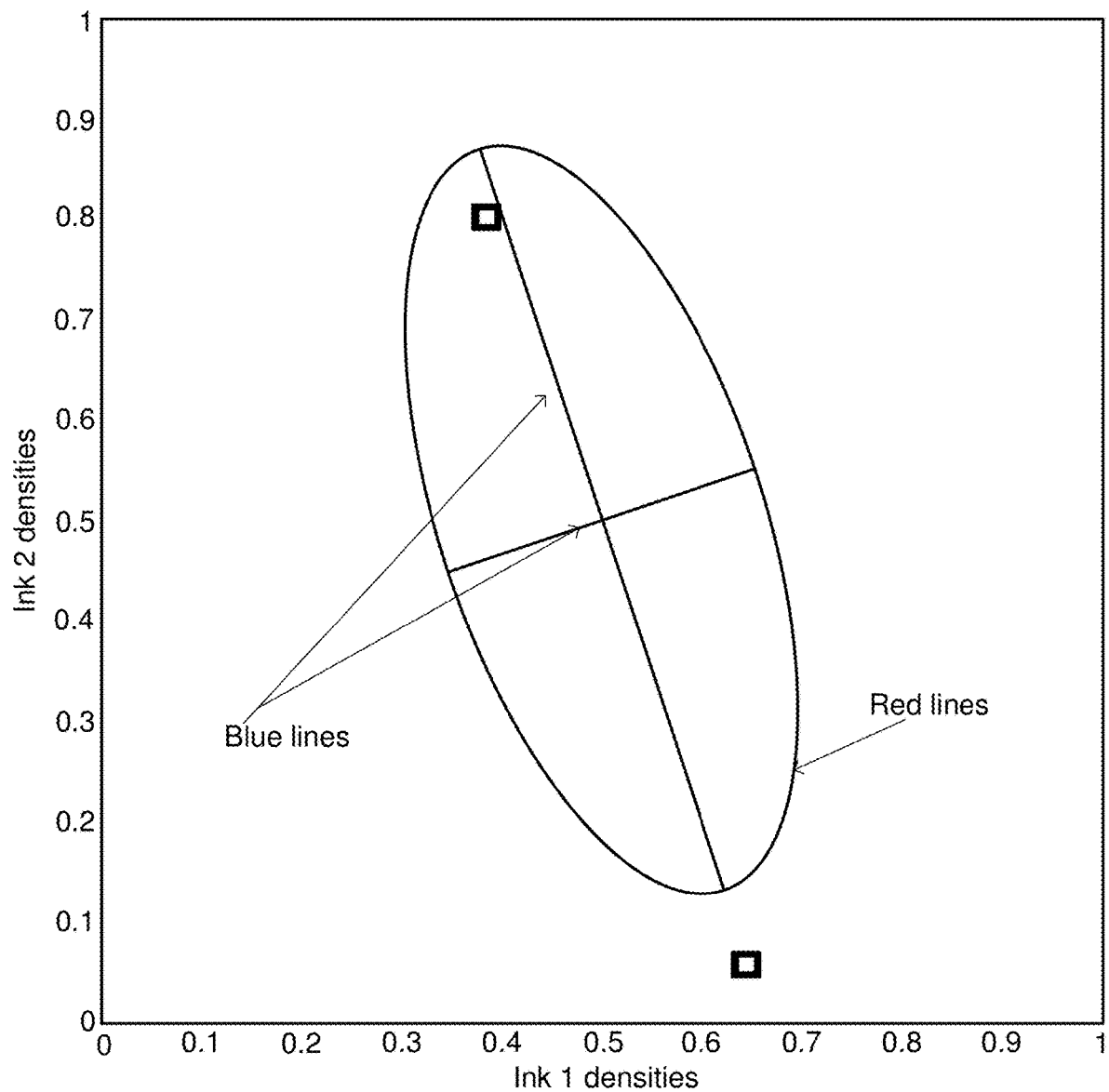
FIG. 36 shows a top view of elliptical region of acceptable visibility shows FIG. 34.

We use this linear approximation to plot the red ellipses in FIGS. 33 and 34. FIG. 35 plots a better view of the best fit ellipse of FIG. 33. In this plot the visibility is 1.0 and the green shaded area fits nicely into the red ellipse predicted by the linear approximation. (In FIG. 35, the visibility target is 1.0 and the green shaded gradient is the watermark signal corresponding to the "gray" color channel, S=((R+G+B)/3). The boxes indicate the optimal color direction. Blue lines and red outline indicate the linear approximation results. FIG. 36 plots a better view of the best fit ellipse of FIG. 34. In this FIG. 34, the visibility is 2.0 and enumerated region of acceptable visibility, shown as the green gradient, does not fit as precisely into the red ellipse of the linear approximation. (In FIG. 34, the visibility target is 2.0 and the green shaded gradient is the watermark signal corresponding to the "U" color channel, S=(−0.15 R−0.29 G+0.44 B). The boxes indicate the optimal color direction. Blue lines and red outline indicate the linear approximation results.)

The major axis of the elliptical boundary of visibly acceptable points, predicted by the linear approximation, is color direction way to introduce the highest ink tweak at this location. However, the color direction of this tweak is not aligned with the best direction to insert a watermark signal. If we choose the "gray" strength signal (e.g. S=(R+G+B)/3), as in FIG. 35, then these directions are quite different. If we set the strength to be S=U=(−0.15 R−0.29 G+0.44 B), as in FIG. 36, then the major axis is closely aligned with the optimal embed direction. This is another insight into why the original Chrominance watermark (see Reed, A., Rogers, E., James, D., "Chrominance Watermark for Mobile Applications", Proceedings of SPIE (2010)) works so well.

As we said above, the First Fundamental Form, defined by the matrix in equation 29, is crucial to understanding the structure of a surface. The First Fundamental Form determines the Gaussian Curvature for the surface. The intrinsic curvature is an important source of error in the affine approximation of equation 26. There is some work in understanding the curvature of color space (see, for example, Kohei, T., Chao, J., Lenz, R., "On Curvature of Color Spaces and its Implications", CGIV 2010: 5th European Conference on Colour in Graphics, Imaging, and Vision, 393-398 (2010)). This work may help determine which colors allow for an accurate affine approximation.

5. Test Results

The algorithm of section 3 was used to embed an image composed with four spot colors: cyan, yellow, red, and blue. We embedded the image using the optimal embedder described in section 3 but we only varied the cyan and yellow channels (a two-color embed). We also embedded the image with our original luminance embedder described in Alattar, O., Reed, A., "Watermarking Spot Colors", Proceedings of SPIE (2003). To do this we converted the image to RGB spot colors, converting the cyan and yellow plates to a single green plate, and embedded the green channel. The two embeds were given the same visibility target.

The embedded images were printed and then scanned at 300 dpi to produce a digital image. This image was attacked with progressive Gaussian noise. The detector is a blind detector (original cover image is not required for detection) with a template for recover of geometric distortions.

Figure 37:
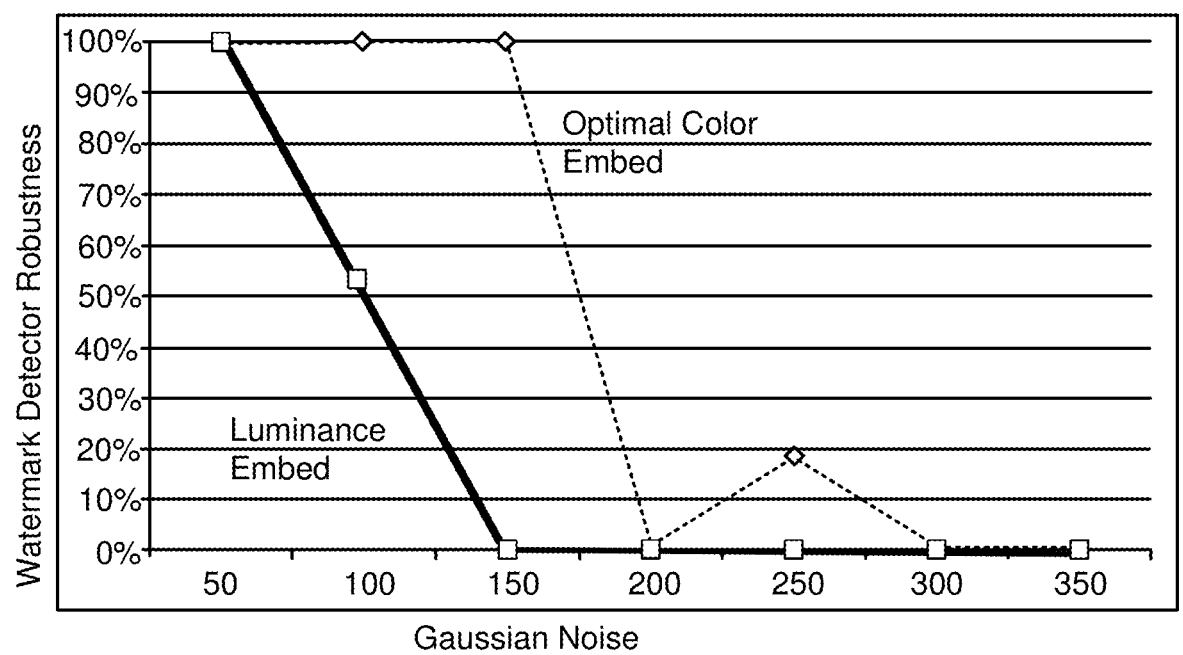
FIG. 37 is a plot showing robustness results for luminance vs. optimal color embed.

The results for a single visibility threshold are shown in FIG. 37. The optimal color embedder performs significantly better than the luminance spot color embedder. The optimal color embedded image sustains more noise before detection fails. This is typical of the visibility thresholds tested but a systematic analysis of all reasonable thresholds has not yet been accomplished.

6. Conclusions and Future Work

The algorithm described in Section 3 was tested in the case where two spot colors are altered and the initial results are quite promising. The user specifies a target visibility and the algorithm will find the appropriate signal strength and the optimal color direction to embed at each pixel.

The enumerated version is computationally expensive but the computation of the visibility regions only depends on the starting color and the visibility threshold. It should be possible to generate tables of acceptable visibility regions. The regions would depend on the starting color and the visibility threshold. A smaller table is preferable Of course, these technique will likely work for three inks. The geometric method for three dimensions could play a valuable role in reducing computational complexity while retaining sufficient accuracy to embed correctly.

In the case of four or more inks there is a built in redundancy because several combinations of ink perturbations will result in identical colors. An ideal system would have an automated way to arbitrate this redundancy.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, and/or by executing software or instructions with a processor or circuitry. Similarly, watermark data decoding or decoders may be implemented in software, firmware, hardware, combinations of software, firmware and hardware, a programmable computer, electronic processing circuitry, and/or by executing software or instructions with a processor, parallel processors or other multi-processor configurations.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by a processor (or electronic processing circuitry, hardware, digital circuit, etc.).

While one embodiment discusses inverting the polarity in a second color channel (e.g., a 'b' channel), one could also invert the polarity in the first color channel (e.g., an 'a' channel) instead. In such a case, the first color channel is then preferably subtracted from the second color channel.

The particular combinations of elements and features in the above-detailed embodiments (including Appendices A, B & C) are exemplary only; the interchanging and substitution of these teachings with other teachings in this and the incorporated-by-reference patents are also contemplated.

What is claimed is:

1. An apparatus comprising:
   an input to receive data representing pixels associated with a digital image;
   means for evaluating, for each of a set of pixels from the digital image, candidate pixel changes to carry an encoded signal, the pixel changes corresponding to +/−n increments of an ink percentage for a first color ink, wherein n is an integer, in which said means for evaluating considers a perceptual error per pixel associated with each pixel change;

means for determining which of the pixel changes fall within an allowable visibility threshold, said determining identifying a subset of pixel changes;

means for reducing the number of pixel changes within the subset of pixel changes according to minimum and maximum percent (%) dot press limits, said reducing yielding remaining pixel changes;

means for weighting the remaining pixel changes according to color weights to yield weighted pixel changes; and means for comparing at least one of the weighted pixel changes relative to printing press constraints to identify a weighted pixel change associated with a pixel, the weighted pixel change used to alter the digital image to carry the encoded signal.

2. The apparatus of claim 1 in which the visibility threshold is defined by an allowable visibility error per pixel.

3. The apparatus of claim 2 in which the allowable visibility error is scaled by a luminance masking function.

4. The apparatus of claim 1 in which the color weights are aligned with an embedding color direction.

5. The apparatus of claim 1 further comprising means for ranking, prior to operating said means for comparing, the weighted pixel changes according to signal strength magnitude.

6. The apparatus of claim 5 in which the weighted pixel change with the largest signal magnitude is the at least one of the weighted pixel changes.

7. The apparatus of claim 6 further comprising means for adjusting the at least one of the weighted pixel changes when said means for comparing determines that the at least one of the weighted pixel changes exceeds the printing press constraints, the means for adjusting yielding an adjusted weighted pixel change.

8. The apparatus of claim 7 in which the adjusted weighted pixel change is used instead of the weighted pixel change to alter the digital image to carry the encoded signal.

9. The apparatus of claim 1 further comprising means for transforming the digital image with a plurality of weighted pixel changes to carry the encoded signal therein.

10. A non-transitory computer readable medium comprising instructions stored therein that, when executed by an electronic processor, cause the electronic processor to perform the following:

for each of a set of pixels from a digital image, access candidate pixel changes to help carry an encoded signal, the pixel changes corresponding to +/−n increments of an ink percentage for a first color ink, wherein n is an integer, the access candidate pixel changes considers a perceptual error per pixel associated with each pixel change;

determine which of the pixel changes fall within an allowable visibility threshold, the determine identifying a subset of pixel changes;

reduce the number of pixel changes within the subset of pixel changes according to minimum and maximum percent (%) dot press limits, said reducing yielding remaining pixel changes;

weight the remaining pixel changes according to color weights to yield weighted pixel changes; and evaluate at least one of the weighted pixel changes relative to printing press constraints to identify a weighted pixel change associated with a pixel, the weighted pixel change used to alter the digital image to help carry the encoded signal.

11. The non-transitory computer readable medium of claim 10 in which the allowable visibility threshold is scaled by a luminance masking function.

12. The non-transitory computer readable medium of claim 10 in which the allowable visibility threshold is defined by an allowable visibility error per pixel.

13. The non-transitory computer readable medium of claim 10 in which the color weights are aligned with an embedding color direction.

14. The non-transitory computer readable medium of claim 10, and prior to the evaluate, sorting the weighted pixel changes according to signal strength magnitude.

15. The non-transitory computer readable medium of claim 10 in which a weighted pixel change with a largest signal magnitude is the at least one of the weighted pixel changes.

16. The non-transitory computer readable medium of claim 15 further comprising instructions which clip the at least one of the weighted pixel changes when said evaluate determines that the at least one of the weighted pixel changes exceeds the printing press constraints, the clip yielding a clipped weighted pixel change.

17. The non-transitory computer readable medium of claim 16 in which the clipped weighted pixel change is used instead of the weighted pixel change to alter the digital image to carry the encoded signal.

18. The non-transitory computer readable medium of claim 16 further comprising instructions that alter the digital image with a plurality of weighted pixel changes to carry the encoded signal therein.

* * * * *